United States Patent
Ohno et al.

(10) Patent No.: US 9,322,586 B2
(45) Date of Patent: Apr. 26, 2016

(54) CONTROL DEVICE AND CONTROL METHOD FOR COOLING SYSTEM

(75) Inventors: Yuichi Ohno, Nishio (JP); Kazuhide Uchida, Hamamatsu (JP); Yuki Jojima, Nagoya (JP); Yoshiaki Kawakami, Nagoya (JP); Eizo Takahashi, Chiryu (JP); Kousuke Sato, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 275 days.

(21) Appl. No.: 14/342,743

(22) PCT Filed: Sep. 4, 2012

(86) PCT No.: PCT/IB2012/001704
§ 371 (c)(1),
(2), (4) Date: May 6, 2014

(87) PCT Pub. No.: WO2013/034963
PCT Pub. Date: Mar. 14, 2013

(65) Prior Publication Data
US 2014/0290289 A1    Oct. 2, 2014

(30) Foreign Application Priority Data
Sep. 5, 2011    (JP) ................. 2011-192837

(51) Int. Cl.
*B60H 1/32* (2006.01)
*F25B 49/02* (2006.01)
(Continued)

(52) U.S. Cl.
CPC ............ *F25B 49/02* (2013.01); *B60H 1/00385* (2013.01); *B60H 1/00885* (2013.01); *B60H 1/00978* (2013.01); *B60H 1/143* (2013.01); *B60H 1/3225* (2013.01)

(58) Field of Classification Search
CPC ................. B60H 1/00371; B60H 2001/00235; F25B 41/062; F25B 49/05
USPC ............................ 62/244, 115, 126, 498, 509
See application file for complete search history.

(56) References Cited

U.S. PATENT DOCUMENTS

| 4,677,830 A | 7/1987 | Sumikawa et al. |
| 6,651,450 B1 | 11/2003 | Tamegai et al. |

(Continued)

FOREIGN PATENT DOCUMENTS

| JP | S48-101640 A | 12/1973 |
| JP | H08-207547 A | 8/1996 |

(Continued)

OTHER PUBLICATIONS

May 26, 2015 Office Action issued in Japanese Patent Application No. 2011-192837.

*Primary Examiner* — Melvin Jones
(74) *Attorney, Agent, or Firm* — Oliff PLC

(57) ABSTRACT

A cooling system includes: a compressor that circulates refrigerant; a heat exchanger that exchanges heat between the refrigerant and outside air; a cooling portion that uses the refrigerant to cool the heat generating source; a first line through which the refrigerant, which has been discharged from the compressor, flows to the cooling portion; a second line through which the refrigerant circulates between the heat exchanger and the cooling portion; and a selector valve that switches between fluid communication of the first line and fluid communication of the second line. A control device includes a detecting unit configured to detect an abnormality of the compressor; and a switching unit configured to switch the selector valve to interrupt the fluid communication of the first line and to allow the fluid communication of the second line when the abnormality has been detected by the detecting unit.

14 Claims, 10 Drawing Sheets

(51) Int. Cl.
  *B60H 1/00*   (2006.01)
  *B60H 1/14*   (2006.01)

(56) References Cited

U.S. PATENT DOCUMENTS

| | | |
|---|---|---|
| 2010/0087976 A1 | 4/2010 | Aridome et al. |
| 2011/0214838 A1* | 9/2011 | Akiyama ........... B60H 1/00278 165/41 |
| 2012/0159986 A1* | 6/2012 | Imanishi ................. B60L 1/003 62/498 |
| 2013/0233004 A1* | 9/2013 | Piesker .................. F25B 39/00 62/119 |
| 2013/0283835 A1* | 10/2013 | Katoh ................ B60H 1/00328 62/180 |

FOREIGN PATENT DOCUMENTS

| | | |
|---|---|---|
| JP | 2001-090570 A | 4/2001 |
| JP | A-2002-313441 | 10/2002 |
| JP | A-2005-090862 | 4/2005 |
| JP | A-2006-179190 | 7/2006 |
| JP | A-2007-069733 | 3/2007 |
| JP | A-2008-239079 | 10/2008 |

\* cited by examiner

| MODE | FLOW REGULATING VALVE 28 | VALVE 57 | VALVE 58 |
|---|---|---|---|
| AIR CONDITIONER OPERATION MODE | FLOW REGULATING VALVE 28 IS ADJUSTED SO THAT SUFFICIENT REFRIGERANT FLOWS TO COOLING PORTION 30 | FULLY OPEN | FULLY CLOSED |
| HEAT PIPE OPERATION MODE | FULLY CLOSED | FULLY CLOSED | FULLY OPEN |

CONTROL DEVICE AND CONTROL METHOD FOR COOLING SYSTEM

BACKGROUND OF THE INVENTION

1. Field of the Invention

The invention relates to a control device and control method for a cooling system and, more particularly, to a control device and control method for a cooling system that cools a heat generating source.

2. Description of Related Art

In recent years, hybrid vehicles, fuel cell vehicles, electric vehicles, and the like, that travel with the use of driving force of a motor become a focus of attention as one of measures against environmental issues. In such vehicles, electrical devices, such as a motor, a generator, an inverter, a converter and a battery, exchange electric power to generate heat. Therefore, these electrical devices need to be cooled. Then, there has been suggested a technique that utilizes a vapor compression refrigeration cycle, which is used as a vehicle air conditioner, to cool a heat generating element.

For example, Japanese Patent Application Publication No. 2007-69733 (JP 2007-69733 A) describes a system in which a heat exchanger that exchanges heat with air-conditioning air and a heat exchanger that exchanges heat with a heat generating element are arranged in parallel with each other in a refrigerant line routed from an expansion valve to a compressor and refrigerant for an air conditioner is utilized to cool the heat generating element. Japanese Patent Application Publication No. 2005-90862 (JP 2005-90862 A) describes a cooling system in which a heat generating element cooling unit for cooling a heat generating element is provided in a bypass line that bypasses the decompressor, evaporator and compressor of an air-conditioning refrigeration cycle.

Japanese Patent Application Publication No. 2006-179190 (JP 2006-179190 A) describes an in-vehicle battery pack. The in-vehicle battery pack includes a case body and an evaporator of an air-conditioning refrigeration cycle. The case body includes a layer cell assembly and an air duct inside. The evaporator is installed inside the case body in order to cool cooling air flowing through the air duct. Japanese Patent Application Publication No. 2002-313441 (JP 2002-313441 A) describes a battery cooling system. In the battery cooling system, an evaporator that is cooled by refrigerant supplied from a refrigeration cycle of an air-conditioning system via a cooling bypass line is arranged in a cooling line to which part or whole of a battery is exposed, and air in the cooling line is circulated by an air blower.

On the other hand, as for a control device for a hybrid vehicle, Japanese Patent Application Publication No. 2008-239079 (JP 2008-239079 A) describes a technique as follows. An abnormality of a driving battery is monitored. When an abnormality other than a temperature-related abnormality has been detected, the vehicle is shifted into a batteryless drive mode. Then, when a temperature abnormality of the driving battery has been detected in the batteryless drive mode, the vehicle is stopped.

JP 2007-69733 A, JP 2005-90862 A, JP 2006-179190 A and JP 2002-313441 A do not describe that the heat generating element is continuously cooled when an abnormality has occurred in the refrigeration cycle, such as an abnormality of a compressor and a shortage of refrigerant circulating through the refrigeration cycle. Therefore, when an abnormality occurs in the refrigeration cycle, cooling performance for cooling the heat generating element decreases, and the temperature of the heat generating element problematically increases.

SUMMARY OF THE INVENTION

The invention provides a control device and control method for a cooling system, which are able to suppress an increase in the temperature of a heat generating source when an abnormality occurs in a refrigeration cycle.

A first aspect of the invention provides a control device for a cooling system that cools a heat generating source. The cooling system includes: a compressor that circulates refrigerant; a heat exchanger that exchanges heat between the refrigerant and outside air; a cooling portion that uses the refrigerant to cool the heat generating source; a first line through which the refrigerant, which has been discharged from the compressor, flows to the cooling portion; a second line through which the refrigerant circulates between the heat exchanger and the cooling portion; and a selector valve that switches between fluid communication of the first line and fluid communication of the second line. The control device includes a detecting unit configured to detect an abnormality of the compressor; and a switching unit configured to switch the selector valve to interrupt the fluid communication of the first line and to allow the fluid communication of the second line when the abnormality has been detected by the detecting unit.

Another aspect of the invention provides a control device for a cooling system. The control device includes: a detecting unit configured to detect an abnormality of a flow rate of the refrigerant supplied to the cooling portion during operation of the compressor; and a switching unit configured to switch the selector valve to interrupt the fluid communication of the first line and to allow the fluid communication of the second line when the abnormality has been detected by the detecting unit.

In the control device, the heat generating source may be mounted on a vehicle, the control device may further include a restricting unit restricts a travelling state of the vehicle when the abnormality has been detected by the detecting unit.

The control device may further include a cooling performance increasing unit configured to increase cooling performance of the cooling system for cooling the heat generating source when the abnormality has been detected by the detecting unit.

The control device may further include a notification unit configured to provide notification of the abnormality when the abnormality has been detected by the detecting unit.

A further another aspect of the invention provides a control method for a cooling system that cools a heat generating source. The cooling system includes: a compressor that circulates refrigerant; a heat exchanger that exchanges heat between the refrigerant and outside air; a cooling portion that uses the refrigerant to cool the heat generating source; a first line through which the refrigerant, which has been discharged from the compressor, flows to the cooling portion; a second line through which the refrigerant circulates between the heat exchanger and the cooling portion; and a selector valve that switches between fluid communication of the first line and fluid communication of the second line. The control method includes: determining whether there is an abnormality in the compressor; and, switching the selector valve to interrupt the fluid communication of the first line and to allow the fluid communication of the second line when it is determined that there is the abnormality.

Yet another aspect of the invention provides a control method for a cooling system. The control method includes: determining whether there is an abnormality in a flow rate of the refrigerant supplied to the cooling portion during operation of the compressor; and, switching the selector valve to interrupt the fluid communication of the first line and to allow the fluid communication of the second line when it is determined that there is the abnormality.

In the control method, the heat generating source may be mounted on a vehicle, and the control method may further include restricting a travelling state of the vehicle when it is determined that there is the abnormality.

The control method may further include increasing cooling performance of the cooling system for cooling the heat generating source when it is determined that there is the abnormality.

The control method may further include providing notification of the abnormality when it is determined that there is the abnormality.

According to the aspects of the invention, when an abnormality has occurred in the refrigeration cycle, it is possible to suppress an increase in the temperature of the heat generating source.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
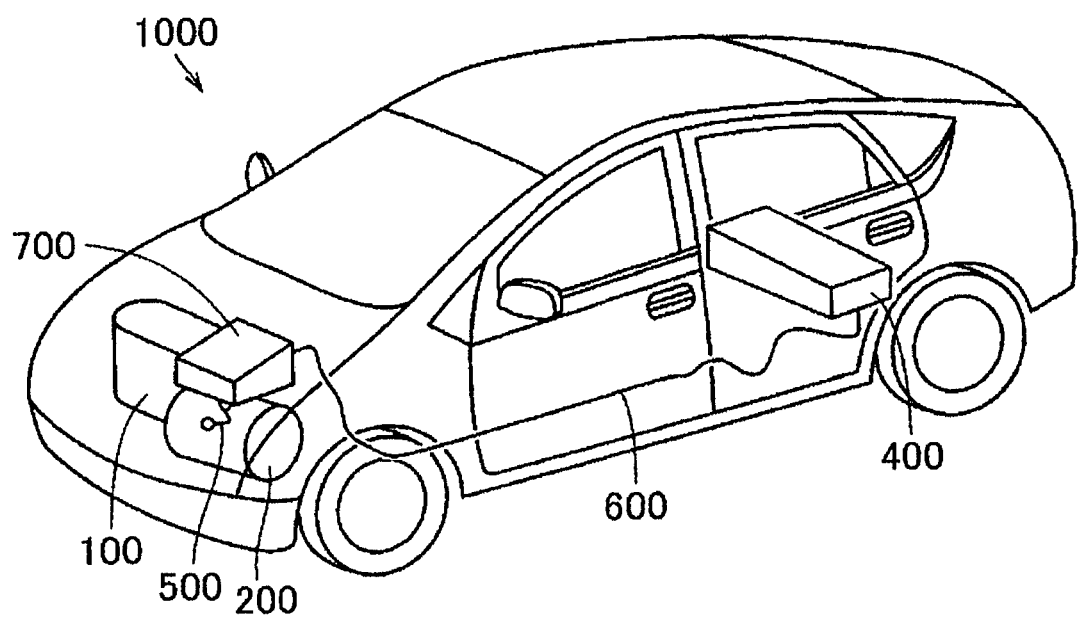
FIG. 1 is a schematic view that shows the configuration of a vehicle to which a cooling system is applied.

Hereinafter, embodiments of the invention will be described with reference to the accompanying drawings. Note that like reference numerals denote the same or corresponding portions in the drawings and the description thereof is not repeated.

First Embodiment

FIG. 1 is a schematic view that shows the configuration of a vehicle 1000 to which a cooling system 1 is applied. The vehicle 1000 according to the present embodiment includes an engine 100 that serves as an internal combustion engine, a drive unit 200 that serves as an electric motor, a power control unit (PCU) 700 and a driving battery 400. The vehicle 1000 is a hybrid vehicle that uses the engine 100 and the drive unit 200 as power sources. Note that the cooling system 1 according to the aspects of the invention may be applied to not only a hybrid vehicle that uses an engine and an electric motor as power sources but also a vehicle that uses only an electric motor as a power source (in the specification, both vehicles are collectively referred to as electric vehicles).

The engine 100 may be a gasoline engine or a diesel engine. The drive unit 200 generates driving force for driving the vehicle 1000 in cooperation with the engine 100. The engine 100 and the drive unit 200 both are provided in an engine room of the vehicle 1000. The drive unit 200 is electrically connected to the PCU 700 via a cable 500. In addition, the PCU 700 is electrically connected to the driving battery 400 via a cable 600.

Figure 2:
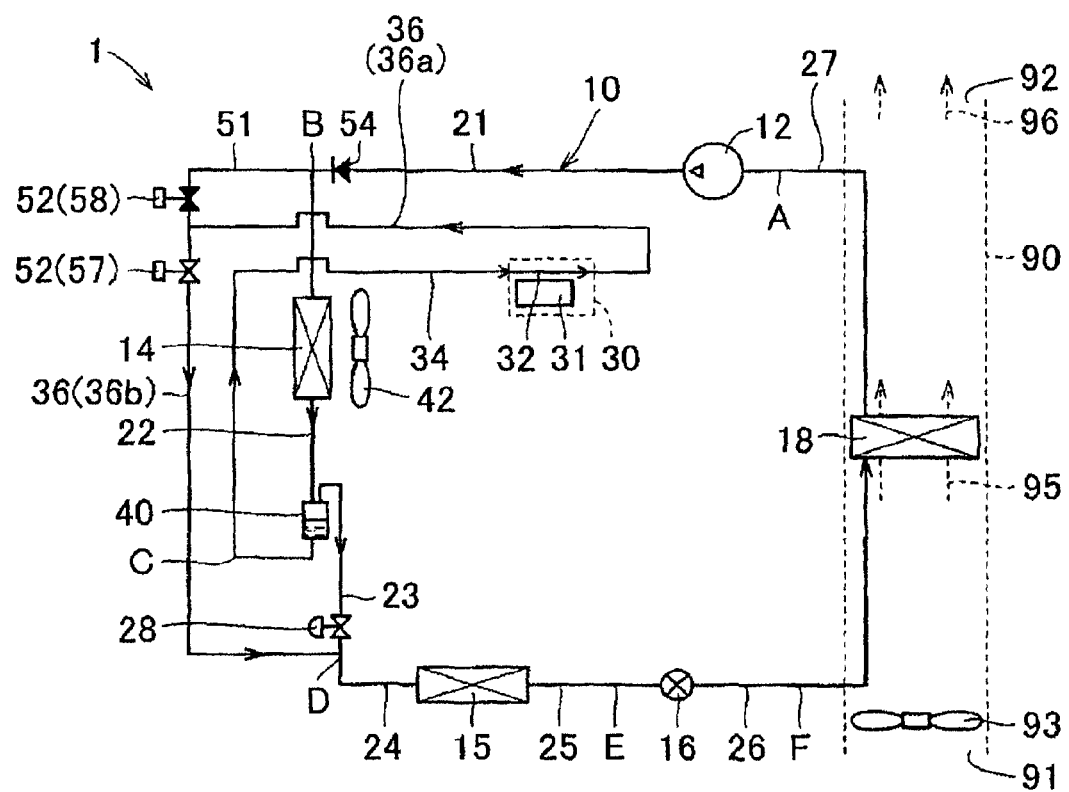
FIG. 2 is a schematic view that shows the configuration of a cooling system according to a first embodiment.

FIG. 2 is a schematic view that shows the configuration of the cooling system 1 according to the first embodiment. As shown in FIG. 2, the cooling system 1 includes a vapor compression refrigeration cycle 10. The vapor compression refrigeration cycle 10 is, for example, mounted on a vehicle in order to cool the cabin of the vehicle 1000. Cooling with the use of the vapor compression refrigeration cycle 10 is performed, for example, when a switch for cooling is turned on or when an automatic control mode in which the temperature in the cabin of the vehicle is automatically adjusted to a set temperature is selected and the temperature in the cabin is higher than the set temperature.

The vapor compression refrigeration cycle 10 includes a compressor 12, a heat exchanger 14 that serves as a first heat exchanger, a heat exchanger 15, an expansion valve 16 that is an example of a decompressor, and a heat exchanger 18 that serves as a second heat exchanger. The vapor compression refrigeration cycle 10 further includes a gas-liquid separator 40. The gas-liquid separator 40 is arranged in a path of refrigerant between the heat exchanger 14 and the heat exchanger 15.

The compressor 12 is actuated by a motor or engine equipped for the vehicle as a power source, and adiabatically compresses refrigerant gas to provide superheated refrigerant gas. The compressor 12 introduces and compresses gaseous refrigerant flowing from the heat exchanger 18 during operation of the vapor compression refrigeration cycle 10, and discharges high-temperature and high-pressure gaseous refrigerant to a refrigerant line 21. The compressor 12 discharges refrigerant to the refrigerant line 21 to thereby circulate refrigerant in the vapor compression refrigeration cycle 10.

The heat exchangers 14 and 15 cause superheated refrigerant gas, compressed in the compressor 12, to release heat to an external medium with a constant pressure and to become refrigerant liquid. High-pressure gaseous refrigerant discharged from the compressor 12 releases heat to the surroundings to be cooled in the heat exchangers 14 and 15 to thereby condense (liquefy). Each of the heat exchangers 14 and 15 includes tubes and fins. The tubes flow refrigerant. The fins are used to exchange heat between refrigerant flowing through the tubes and air around the heat exchanger 14 or 15.

Each of the heat exchangers 14 and 15 exchanges heat between refrigerant and cooling air. Cooling air may be supplied to the heat exchangers 14 and 15 as natural draft generated as the vehicle travels. Alternatively, cooling air may be supplied to the heat exchangers 14 and 15 as forced draft from a cooling fan, such as a condenser fan 42 and an engine cooling radiator fan. Owing to heat exchange in the heat exchangers 14 and 15, the temperature of refrigerant decreases, and refrigerant liquefies.

The expansion valve 16 causes high-pressure liquid refrigerant, flowing through a refrigerant line 25, to be sprayed through a small hole to expand into low-temperature and low-pressure atomized refrigerant. The expansion valve 16 decompresses refrigerant liquid, condensed in the heat exchangers 14 and 15, into wet steam in a gas-liquid mixing state. Note that a decompressor for decompressing refrigerant liquid is not limited to the expansion valve 16 that carries out throttle expansion; instead, the decompressor may be a capillary tube.

Atomized refrigerant flowing inside the heat exchanger 18 vaporizes to absorb heat of ambient air that is introduced so as to contact the heat exchanger 18. The heat exchanger 18 uses low-temperature and low-pressure refrigerant decompressed by the expansion valve 16 to absorb heat of vaporization, required at the time when wet steam of refrigerant evaporates into refrigerant gas, from air-conditioning air flowing to the cabin of the vehicle to thereby cool the cabin of the vehicle. Air-conditioning air, of which the temperature is decreased as heat is, absorbed by the heat exchanger 18, flows into the cabin of the vehicle to cool the cabin of the vehicle. Refrigerant absorbs heat from the surroundings in the heat exchanger 18 to be heated.

The heat exchanger 18 includes tubes and fins. The tubes flow refrigerant. The fins are used to exchange heat between refrigerant flowing through the tubes and air around the heat exchanger 18. Refrigerant in a wet steam state flows through the tubes. When refrigerant flows through the tubes, the refrigerant absorbs heat of air in the cabin of the vehicle as latent heat of vaporization via the fins to evaporate, and further becomes superheated steam because of sensible heat. Vaporized refrigerant flows into the compressor 12 via a refrigerant line 27. The compressor 12 compresses refrigerant flowing from the heat exchanger 18.

The vapor compression refrigeration cycle 10 further includes the refrigerant line 21, refrigerant lines 22, 23 and 24, the refrigerant line 25, a refrigerant line 26 and the refrigerant line 27. The refrigerant line 21 provides fluid communication between the compressor 12 and the heat exchanger 14. The refrigerant lines 22, 23 and 24 provide fluid communication between the heat exchanger 14 and the heat exchanger 15. The refrigerant line 25 provides fluid communication between the heat exchanger 15 and the expansion valve 16. The refrigerant line 26 provides fluid communication between the expansion valve 16 and the heat exchanger 18. The refrigerant line 27 provides fluid communication between the heat exchanger 18 and the compressor 12.

The refrigerant line 21 is a line for flowing refrigerant from the compressor 12 to the heat exchanger 14. Refrigerant flows through the refrigerant line 21 from the outlet of the compressor 12 toward the inlet of the heat exchanger 14 between the compressor 12 and the heat exchanger 14. The refrigerant lines 22 to 25 are lines for flowing refrigerant from the heat exchanger 14 to the expansion valve 16. Refrigerant flows through the refrigerant lines 22 to 25 from the outlet of the heat exchanger 14 toward the inlet of the expansion valve 16 between the heat exchanger 14 and the expansion valve 16.

The refrigerant line 26 is a line for flowing refrigerant from the expansion valve 16 to the heat exchanger 18. Refrigerant flows through the refrigerant line 26 from the outlet of the expansion valve 16 toward the inlet of the heat exchanger 18 between the expansion valve 16 and the heat exchanger 18. The refrigerant line 27 is a line for flowing refrigerant from the heat exchanger 18 to the compressor 12. Refrigerant flows through the refrigerant line 27 from the outlet of the heat exchanger 18 toward the inlet of the compressor 12 between the heat exchanger 18 and the compressor 12.

The vapor compression refrigeration cycle 10 is formed such that the compressor 12, the heat exchangers 14 and 15, the expansion valve 16 and the heat exchanger 18 are coupled by the refrigerant lines 21 to 27. Note that refrigerant used in the vapor compression refrigeration cycle 10 may be, for example, carbon dioxide, hydrocarbon, such as propane and isobutane, ammonia, chlorofluorocarbons, water, or the like.

The gas-liquid separator 40 separates refrigerant, flowing out from the heat exchanger 14, into gaseous refrigerant and liquid refrigerant. Refrigerant liquid that is liquid refrigerant and refrigerant steam that is gaseous refrigerant are stored inside the gas-liquid separator 40. The refrigerant lines 22 and 23 and the refrigerant line 34 are coupled to the gas-liquid separator 40.

Refrigerant is in a wet steam gas-liquid two-phase state, mixedly containing saturated liquid and saturated steam, on the outlet side of the heat exchanger 14. Refrigerant flowing out from the heat exchanger 14 is supplied to the gas-liquid separator 40 through the refrigerant line 22. Refrigerant in a gas-liquid two-phase state, flowing from the refrigerant line 22 into the gas-liquid separator 40, is separated into gas and liquid inside the gas-liquid separator 40. The gas-liquid separator 40 separates refrigerant, condensed by the heat exchanger 14, into liquid-state refrigerant liquid and gaseous refrigerant steam and temporarily stores them.

The separated refrigerant liquid flows out to the outside of the gas-liquid separator 40 via the refrigerant line 34. The end portion of the refrigerant line 34 arranged in liquid inside the gas-liquid separator 40 forms an outlet port through which liquid refrigerant flows out from the gas-liquid separator 40. The separated refrigerant steam flows out to the outside of the gas-liquid separator 40 via the refrigerant line 23. The end portion of the refrigerant line 23 arranged in gas inside the gas-liquid separator 40 forms an outlet port through which gaseous refrigerant flows out from the gas-liquid separator 40. Gaseous refrigerant steam delivered from the gas-liquid separator 40 radiates heat to the surroundings in the heat exchanger 15 to be cooled to thereby condense. The heat exchanger 15 serves as a third heat exchanger.

Inside the gas-liquid separator 40, the refrigerant liquid accumulates at the lower side and the refrigerant steam accumulates at the upper side. The end portion of the refrigerant line 34 that delivers refrigerant liquid from the gas-liquid separator 40 is coupled to the bottom portion of the gas-liquid separator 40. Only refrigerant liquid is delivered from the bottom side of the gas-liquid separator 40 to the outside of the gas-liquid separator 40 via the refrigerant line 34. The end portion of the refrigerant line 23 that delivers refrigerant steam from the gas-liquid separator 40 is coupled to the ceiling portion of the gas-liquid separator 40. Only refrigerant steam is delivered from the ceiling side of the gas-liquid separator 40 to the outside of the gas-liquid separator 40 via the refrigerant line 23. By so doing, the gas-liquid separator 40 is able to reliably separate gaseous refrigerant and liquid refrigerant from each other.

The path through which refrigerant flows from the outlet of the heat exchanger 14 toward the inlet of the expansion valve 16 includes the refrigerant line 22, the refrigerant line 23, the refrigerant line 24 and the refrigerant line 25. The refrigerant line 22 is routed from the outlet side of the heat exchanger 14 to the gas-liquid separator 40. The refrigerant line 23 flows out refrigerant steam from the gas-liquid separator 40, and passes through a flow regulating valve 28 (described later). The refrigerant line 24 is coupled to the inlet side of the heat exchanger 15. The refrigerant line 25 flows refrigerant from the outlet side of the heat exchanger 15 to the expansion valve 16. The refrigerant line 23 is a line through which gaseous refrigerant separated in the gas-liquid separator 40 flows.

The path of refrigerant that flows between the heat exchanger 14 and the heat exchanger 15 includes the refrigerant line 34 and a refrigerant line 36. The refrigerant line 34 provides fluid communication between the gas-liquid separator 40 and the cooling portion 30. The refrigerant line 36 provides fluid communication between the cooling portion 30 and the refrigerant line 24. Refrigerant liquid flows from the gas-liquid separator 40 to the cooling portion 30 via the refrigerant line 34. Refrigerant passing through the cooling portion 30 returns to the refrigerant line 24 via the refrigerant line 36. The cooling portion 30 is provided in the path of refrigerant flowing from the heat exchanger 14 toward the heat exchanger 15.

Point D shown in FIG. 2 indicates a coupling point among the refrigerant line 23, the refrigerant line 24 and the refrigerant line 36. That is, point D indicates the downstream-side (side closer to the heat exchanger 15) end portion of the refrigerant line 23, the upstream-side (side closer to the heat exchanger 14) end portion of the refrigerant line 24 and the downstream-side end portion of the refrigerant line 36. The refrigerant line 23 forms part of the path routed from the gas-liquid separator 40 to point D within the path of refrigerant flowing from the gas-liquid separator 40 toward the expansion valve 16.

The cooling system 1 further includes a path of refrigerant arranged in parallel with the refrigerant line 23. The cooling portion 30 is provided in that path of refrigerant. The cooling portion 30 is provided in one of the plurality of parallel connected lines in the path of refrigerant flowing from the gas-liquid separator 40 toward the heat exchanger 15 between the heat exchanger 14 and the expansion valve 16. The cooling portion 30 includes an electric vehicle (EV) device 31 and a cooling line 32. The EV device 31 is an electrical device mounted on the vehicle. The cooling line 32 is a line through which refrigerant flows. The EV device 31 is an example of a heat generating source. One end portion of the cooling line 32 is connected to the refrigerant line 34. The other end portion of the cooling line 32 is connected to the refrigerant line 36.

The path of refrigerant, connected in parallel with the refrigerant line 23 between the gas-liquid separator 40 and point D shown in FIG. 2, includes the refrigerant line 34 on the upstream side (side closer to the gas-liquid separator 40) of the cooling portion 30, the cooling line 32 included in the cooling portion 30, and the refrigerant line 36 on the downstream side (side closer to the heat exchanger 15) of the cooling portion 30. The refrigerant line 34 is a line for flowing liquid refrigerant from the gas-liquid separator 40 to the cooling portion 30. The refrigerant line 36 is a line for flowing refrigerant from the cooling portion 30 to point D. Point D is a branching portion between the refrigerant lines 23 and 24 and the refrigerant line 36.

Refrigerant liquid flowing out from the gas-liquid separator 40 flows toward the cooling portion 30 via the refrigerant line 34. Refrigerant that flows to the cooling portion 30 and that flows via the cooling line 32 takes heat from the EV device 31 that serves as the heat generating source to cool the EV device 31. The cooling portion 30 uses liquid refrigerant, separated in the gas-liquid separator 40 and flowing to the cooling line 32 via the refrigerant line 34, to cool the EV device 31. Refrigerant flowing through the cooling line 32 exchanges heat with the EV device 31 in the cooling portion 30 to cool the EV device 31, and the refrigerant is heated. Refrigerant further flows from the cooling portion 30 toward point D via the refrigerant line 36, and reaches the heat exchanger 15 via the refrigerant line 24.

The cooling portion 30 is configured to be able to exchange heat between the EV device 31 and refrigerant at the cooling line 32. In the present embodiment, the cooling portion 30, for example, has the cooling line 32 that is formed such that the outer periphery of the cooling line 32 is in direct contact with the casing of the EV device 31. The cooling line 32 has a portion adjacent to the casing of the EV device 31. At that portion, heat is exchangeable between refrigerant, flowing through the cooling line 32, and the EV device 31.

The EV device 31 is directly connected to the outer periphery of the cooling line 32 that forms part of the path of refrigerant, routed from the heat exchanger 14 to the heat exchanger 15 in the vapor compression refrigeration cycle 10, and is cooled. The EV device 31 is arranged on the outside of the cooling line 32, so the EV device 31 does not interfere with flow of refrigerant flowing inside the cooling line 32. Therefore, the pressure loss of the vapor compression refrigeration cycle 10 does not increase, so it is possible to cool the EV device 31 without increasing the power of the compressor 12.

Alternatively, the cooling portion 30 may include a selected known heat pipe that is interposed between the EV device 31 and the cooling line 32. In this case, the EV device 31 is connected to the outer periphery of the cooling line 32 via the heat pipe, and heat is transferred from the EV device 31 to the cooling line 32 via the heat pipe to thereby cool the EV device 31. The EV device 31 serves as a heating portion for heating the heat pipe, and the cooling line 32 serves as a cooling portion for cooling the heat pipe to thereby increase the heat-transfer efficiency between the cooling line 32 and the EV device 31, so it is possible to improve the cooling efficiency of the EV device 31. For example, a Wick heat pipe may be used.

Heat may be reliably transferred from the EV device 31 to the cooling line 32 by the heat pipe, so there may be a distance between the EV device 31 and the cooling line 32, and complex arrangement of the cooling line 32 is not required to bring the cooling line 32 into contact with the EV device 31. As a result, it is possible to improve the flexibility of arrangement of the EV device 31.

The EV device 31 includes an electrical device that exchanges electric power to generate heat. The electrical device includes at least any one of, for example, an inverter used to convert direct-current power to alternating-current power, a motor generator that is a rotating electrical machine, a battery that is an electrical storage device, a step-up converter that is used to step up the voltage of the battery and a DC/DC converter that is used to step down the voltage of the battery. The battery is a secondary battery, such as a lithium ion battery and a nickel metal hydride battery. A capacitor may be used instead of the battery.

The heat exchanger 18 is arranged inside a duct 90 through which air flows. The heat exchanger 18 exchanges heat between refrigerant and air-conditioning air flowing through the duct 90 to adjust the temperature of air-conditioning air. The duct 90 has a duct inlet 91 and a duct outlet 92. The duct inlet 91 is an inlet through which air-conditioning air flows into the duct 90. The duct outlet 92 is an outlet through which air-conditioning air flows out from the duct 90. A fan 93 is arranged near the duct inlet 91 inside the duct 90.

As the fan 93 is driven, air flows through the duct 90. As the fan 93 operates, air-conditioning air flows into the duct 90 via the duct inlet 91. Air flowing into the duct 90 may be outside air or may be air in the cabin of the vehicle. The arrow 95 in FIG. 2 indicates flow of air-conditioning air that flows via the heat exchanger 18 to exchange heat with refrigerant in the vapor compression refrigeration cycle 10. During cooling operation, air-conditioning air is cooled in the heat exchanger 18, and refrigerant receives heat transferred from air-conditioning air to be heated. The arrow 96 indicates flow of air-conditioning air that is adjusted in temperature by the heat exchanger 18 and that flows out from the duct 90 via the duct outlet 92.

Refrigerant passes through a refrigerant circulation path that is formed by sequentially connecting the compressor 12, the heat exchangers 14 and 15, the expansion valve 16 and the heat exchanger 18 by the refrigerant lines 21 to 27 to circulate in the vapor compression refrigeration cycle 10. Refrigerant flows in the vapor compression refrigeration cycle 10 so as to sequentially pass through points A, B, C, D, E and F shown in FIG. 2, and refrigerant circulates among the compressor 12, the heat exchangers 14 and 15, the expansion valve 16 and the heat exchanger 18.

Figure 3:
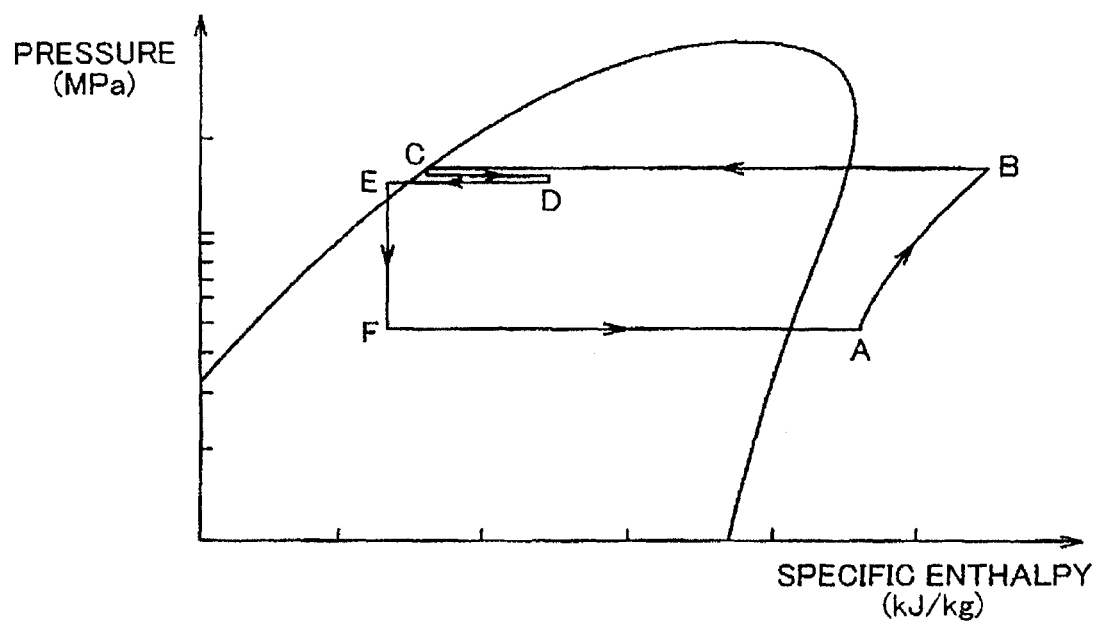
FIG. 3 is a Mollier chart that shows the state of refrigerant in a vapor compression refrigeration cycle.

FIG. 3 is a Mollier chart that shows the state of refrigerant in the vapor compression refrigeration cycle 10. In FIG. 3, the abscissa axis represents the specific enthalpy of refrigerant, and the ordinate axis represents the absolute pressure of refrigerant. The unit of the specific enthalpy is kJ/kg, and the unit of the absolute pressure is MPa. The curve in the chart is the saturation vapor line and saturation liquid line of refrigerant.

FIG. 3 shows the thermodynamic state of refrigerant at points (that is, points A, B, C, D, E and F) in the vapor compression refrigeration cycle 10 when refrigerant flows from the refrigerant line 22 at the outlet of the exchanger 14 into the refrigerant line 34 via the gas-liquid separator 40, cools the EV device 31 and returns from the refrigerant line 36 to the refrigerant line 24 at the inlet of the heat exchanger 15 via point D. The path through which refrigerant flows at this time, that is, the refrigerant line 21, the refrigerant line 22, the refrigerant line 34, the refrigerant line 36 and the refrigerant lines 24 to 27, forms a first line.

As shown in FIG. 3, refrigerant in a superheated steam state (point A), introduced into the compressor 12, is adiabatically compressed in the compressor 12 along a constant specific entropy line. As refrigerant is compressed, the refrigerant increases in pressure and temperature into high-temperature and high-pressure superheated steam having a high degree of superheat (point B), and then the refrigerant flows to the heat exchanger 14. Gaseous refrigerant discharged from the compressor 12 releases heat to the surroundings to be cooled in the heat exchanger 14 to thereby condense (liquefy). Owing to heat exchange with outside air in the heat exchanger 14, the temperature of refrigerant decreases, and refrigerant liquefies. High-pressure refrigerant steam in the heat exchanger 14 becomes dry saturated steam from superheated steam with a constant pressure in the heat exchanger 14, and releases latent heat of condensation to gradually liquefy into wet steam in a gas-liquid mixing state. Condensed refrigerant within refrigerant in a gas-liquid two-phase state is in the state of saturated liquid (point C).

Refrigerant is separated in the gas-liquid separator 40 into gaseous refrigerant and liquid refrigerant. Refrigerant liquid in a liquid phase within refrigerant separated into gas and liquid flows from the gas-liquid separator 40 to the cooling line 32 of the cooling portion 30 via the refrigerant line 34 to cool the EV device 31. In the cooling portion 30, heat is released to liquid refrigerant in a saturated liquid state, which is condensed as it passes through the heat exchanger 14, to thereby cool the EV device 31. Refrigerant is heated by exchanging heat with the EV device 31, and the dryness of the refrigerant increases. Refrigerant receives latent heat from the EV device 31 to partially vaporize into wet steam that mixedly contains saturated liquid and saturated steam (point D).

After that, refrigerant flows into the heat exchanger 15. Wet steam of refrigerant exchanges heat with outside air in the heat exchanger 15 to be cooled to thereby condense again, becomes saturated liquid as the entire refrigerant condenses, and further releases sensible heat to become supercooled liquid (point E). After that, refrigerant flows into the expansion valve 16 via the refrigerant line 25. In the expansion valve 16, refrigerant in a supercooled liquid state is throttle-expanded, and the refrigerant decreases in temperature and pressure with the specific enthalpy unchanged to become low-temperature and low-pressure wet steam in a gas-liquid mixing state (point F).

Refrigerant in a wet steam state from the expansion valve 16 flows into the heat exchanger 18 via the refrigerant line 26. Refrigerant in a wet steam state flows into the tubes of the heat exchanger 18. When refrigerant flows through the tubes of the heat exchanger 18, the refrigerant absorbs heat of air in the cabin of the vehicle as latent heat of vaporization via the fins to evaporate with a constant pressure. As the entire refrigerant becomes dry saturated steam, the refrigerant steam further increases in temperature by sensible heat to become superheated steam (point A). After that, refrigerant is introduced into the compressor 12 via the refrigerant line 27. The compressor 12 compresses refrigerant flowing from the heat exchanger 18.

Refrigerant continuously repeats changes among the compressed state, the condensed state, the throttle-expanded state and the evaporated state in accordance with the above-described cycle. Note that, in the above description of the vapor compression refrigeration cycle, a theoretical refrigeration cycle is described; however, in the actual vapor compression refrigeration cycle 10, it is, of course, necessary to consider a loss in the compressor 12, a pressure loss of refrigerant and a heat loss.

During operation of the vapor compression refrigeration cycle 10, refrigerant absorbs heat of vaporization from air in the cabin of the vehicle at the time when the refrigerant evaporates in the heat exchanger 18 that serves as an evaporator to thereby cool the cabin. In addition, high-pressure liquid refrigerant flowing out from the heat exchanger 14 and separated by the gas-liquid separator 40 into gas and liquid flows to the cooling portion 30 and exchanges heat with the EV device 31 to thereby cool the EV device 31. The cooling system 1 cools the EV device 31, which is the heat generating source mounted on the vehicle, with the use of the vapor compression refrigeration cycle 10 for air-conditioning the cabin of the vehicle. Note that the temperature required to cool the EV device 31 is desirably at least lower than the upper limit of a target temperature range of the EV device 31.

The vapor compression refrigeration cycle 10 that is provided in order to cool a cooled portion in the heat exchanger 18 is utilized to cool the EV device 31, so it is not necessary to provide a device, such as an exclusive water circulation pump and a cooling fan, in order to cool the EV device 31. Therefore, components required for the cooling system 1 to cool the EV device 31 may be reduced to make it possible to simplify the system configuration, so the manufacturing cost of the cooling system 1 may be reduced. In addition, it is not necessary to operate a power source, such as a pump and a cooling fan, in order to cool the EV device 31, and power consumption for operating the power source is not required. Thus, it is possible to reduce power consumption for cooling the EV device 31.

In the heat exchanger 14, refrigerant just needs to be cooled into a wet steam state. Refrigerant in a gas-liquid mixing state is separated by the gas-liquid separator 40, and only refrigerant liquid in a saturated liquid state is supplied to the cooling portion 30. Refrigerant in a wet steam state, which receives latent heat of vaporization from the EV device 31 to be partially vaporized, is cooled again in the heat exchanger 15. Refrigerant changes in state at a constant temperature until the refrigerant in a wet steam state completely condenses into saturated liquid. The heat exchanger 15 further supercools liquid refrigerant to a degree of supercooling required to cool the cabin of the vehicle. A degree of supercooling of refrigerant does not need to be excessively increased, so the capacity of each of the heat exchangers 14 and 15 may be reduced. Thus, the cooling performance for cooling the cabin may be ensured, and the size of each of the heat exchangers 14 and 15 may be reduced, so it is possible to obtain the cooling system 1 that is reduced in size and that is advantageous in installation on the vehicle.

The refrigerant line 23 that forms part of the path of refrigerant from the outlet of the heat exchanger 14 toward the inlet of the expansion valve 16 is provided between the heat exchanger 14 and the heat exchanger 15. The refrigerant line 23 that does not pass through the cooling portion 30 and the refrigerant lines 34 and 36 and cooling line 32 that form the path of refrigerant passing through the cooling portion 30 to cool the EV device 31 are provided in parallel with each other as the paths through which refrigerant flowing from the gas-liquid separator 40 toward the expansion valve 16. The cooling system for cooling the EV device 31, including the refrigerant lines 34 and 36, is connected in parallel with the refrigerant line 23. Therefore, only part of refrigerant flowing out from the heat exchanger 14 flows to the cooling portion 30. The amount of refrigerant required to cool the EV device 31 is caused to flow to the cooling portion 30, and the EV device 31 is appropriately cooled. Thus, it is possible to prevent excessive cooling of the EV device 31.

The path of refrigerant that directly flows from the heat exchanger 14 to the heat exchanger 15 and the path of refrigerant that flows from the heat exchanger 14 to the heat exchanger 15 via the cooling portion 30 are provided in parallel with each other, and only part of refrigerant is caused to flow to the refrigerant lines 34 and 36. By so doing, it is possible to reduce the pressure loss at the time when refrigerant flows through the cooling system for cooling the EV device 31. Not the entire refrigerant flows to the cooling portion 30. Therefore, it is possible to reduce the pressure loss associated with flow of refrigerant via the cooling portion 30, and, accordingly, it is possible to reduce power consumption required to operate the compressor 12 for circulating refrigerant.

When low-temperature and low-pressure refrigerant after passing through the expansion valve 16 is used to cool the EV device 31, the cooling performance of air in the cabin in the heat exchanger 18 reduces and the cooling performance for cooling the cabin decreases. In contrast to this, in the cooling system 1 according to the present embodiment, in the vapor compression refrigeration cycle 10, high-pressure refrigerant discharged from the compressor 12 is condensed by both the heat exchanger 14 that serves as a first condenser and the heat exchanger 15 that serves as a second condenser. The two-stage heat exchangers 14 and 15 are arranged between the compressor 12 and the expansion valve 16, and the cooling portion 30 for cooling the EV device 31 is provided between the heat exchanger 14 and the heat exchanger 15. The heat exchanger 15 is provided in the path of refrigerant flowing from the cooling portion 30 toward the expansion valve 16.

By sufficiently cooling refrigerant, which receives latent heat of vaporization from the EV device 31 to be heated, in the heat exchanger 15, the refrigerant has a temperature and a pressure that are originally required to cool the cabin of the vehicle at the outlet of the expansion valve 16. Therefore, it is possible to sufficiently increase the amount of heat externally received when refrigerant evaporates in the heat exchanger 18. Thus, by setting the heat radiation performance for the heat exchanger 15 so as to be able to sufficiently cool refrigerant, it is possible to cool the EV device 31 without any influence on the cooling performance for cooling the cabin. Thus, it is possible to reliably ensure both the cooling performance for cooling the EV device 31 and the cooling performance for cooling the cabin.

When refrigerant flowing from the heat exchanger 14 to the cooling portion 30 cools the EV device 31, the refrigerant receives heat from the EV device 31 to be heated. As refrigerant is heated to a saturated steam temperature or above and the entire amount of the refrigerant vaporizes in the cooling portion 30, the amount of heat exchanged between the refrigerant and the EV device 31 reduces, and the EV device 31 cannot be efficiently cooled, and, in addition, pressure loss at the time when the refrigerant flows in the line increases. Therefore, it is desirable to sufficiently cool refrigerant in the heat exchanger 14 such that the entire amount of refrigerant does not vaporize after cooling the EV device 31.

Specifically, the state of refrigerant at the outlet of the heat exchanger 14 is brought close to saturated liquid, and, typically, refrigerant is placed in a state on the saturated liquid line at the outlet of the heat exchanger 14. Because the heat exchanger 14 is capable of sufficiently cooling refrigerant in this way, the heat radiation performance of the heat exchanger 14 for causing refrigerant to release heat is higher than the heat radiation performance of the heat exchanger 15. By sufficiently cooling refrigerant in the heat exchanger 14 having relatively high heat radiation performance, refrigerant that has received heat from the EV device 31 is maintained in a wet steam state, and a reduction in the amount of heat exchanged between refrigerant and the EV device 31 is avoided, so it is possible to sufficiently cool the EV device 31. Refrigerant in a wet steam state after cooling the EV device 31 is efficiently cooled again in the heat exchanger 15, and is cooled into a supercooled liquid state below a saturated temperature. Thus, it is possible to provide the cooling system 1 that ensures both the cooling performance for cooling the cabin and the cooling performance for cooling the EV device 31.

Refrigerant in a gas-liquid two-phase state at the outlet of the heat exchanger 14 is separated into gas and liquid in the gas-liquid separator 40. Gaseous refrigerant separated in the gas-liquid separator 40 flows via the refrigerant lines 23 and 24 and is directly supplied to the heat exchanger 15. Liquid refrigerant separated in the gas-liquid separator 40 flows via the refrigerant line 34 and is supplied to the cooling portion 30 to cool the EV device 31. The liquid refrigerant is refrigerant in a just saturated liquid state. By taking only liquid refrigerant from the gas-liquid separator 40 and flowing the liquid refrigerant to the cooling portion 30, the performance of the heat exchanger 14 may be fully utilized to cool the EV device 31, so it is possible to provide the cooling system 1 having improved cooling performance for cooling the EV device 31.

Refrigerant in a saturated liquid state at the outlet of the gas-liquid separator 40 is introduced into the cooling line 32 that cools the EV device 31 to thereby make it possible to minimize gaseous refrigerant within refrigerant that flows in the cooling system for cooling the EV device 31, including the refrigerant lines 34 and 36 and the cooling line 32. Therefore, it is possible to suppress an increase in pressure loss due to an increase in the flow rate of refrigerant steam flowing in the cooling system for cooling the EV device 31, and the power consumption of the compressor 12 for flowing refrigerant may be reduced, so it is possible to avoid deterioration of the performance of the vapor compression refrigeration cycle 10.

Refrigerant liquid in a saturated liquid state is stored inside the gas-liquid separator 40. The gas-liquid separator 40 functions as a reservoir that temporarily stores refrigerant liquid that is liquid refrigerant inside. When refrigerant liquid in a predetermined amount is stored in the gas-liquid separator 40, the flow rate of refrigerant flowing from the gas-liquid separator 40 to the cooling portion 30 may be maintained at the time of fluctuations in load. Because the gas-liquid separator 40 has the function of storing liquid, serves as a buffer against load fluctuations and is able to absorb load fluctuations, the cooling performance for cooling the EV device 31 may be stabilized.

Referring back to FIG. 2, the cooling system 1 includes a flow regulating valve 28. The flow regulating valve 28 is arranged in the refrigerant line 23, which forms one of the parallel connected paths, in the path of refrigerant from the heat exchanger 14 toward the expansion valve 16. The flow regulating valve 28 changes its valve opening degree to increase or reduce the pressure loss of refrigerant flowing in the refrigerant line 23 to thereby selectively adjust the flow rate of refrigerant flowing in the refrigerant line 23 and the flow rate of refrigerant flowing in the cooling system for cooing the EV device 31, including the cooling line 32.

For example, as the flow regulating valve 28 is fully closed and the valve opening degree is set at 0%, the entire amount of refrigerant from the heat exchanger 14 flows into the refrigerant line 34 via the gas-liquid separator 40. When the valve opening degree of the flow regulating valve 28 is increased, the flow rate of refrigerant that flows directly to the heat exchanger 15 via the refrigerant line 23 increases and the flow rate of refrigerant that flows to the cooling line 32 via the refrigerant line 34 to cool the EV device 31 reduces within refrigerant that flows from the heat exchanger 14 to the refrigerant line 22. When the valve opening degree of the flow regulating valve 28 is reduced, the flow rate of refrigerant that directly flows to the heat exchanger 15 via the refrigerant line 23 reduces and the flow rate of refrigerant that flows via the cooling line 32 to cool the EV device 31 increases within refrigerant that flows from the heat exchanger 14 to the refrigerant line 22.

As the valve opening degree of the flow regulating valve 28 is increased, the flow rate of refrigerant that cools the EV device 31 reduces, so cooling performance for cooling the EV device 31 decreases. As the valve opening degree of the flow regulating valve 28 reduces, the flow rate of refrigerant that cools the EV device 31 increases, so cooling performance for cooling the EV device 31 improves. The flow regulating valve 28 is used to make it possible to optimally adjust the amount of refrigerant flowing to the EV device 31, so it is possible to reliably prevent excessive cooling of the EV device 31, and, in addition, it is possible to reliably reduce pressure loss associated with flow of refrigerant in the cooling system for cooling the EV device 31 and the power consumption of the compressor 12 for circulating refrigerant.

The cooling system 1 further includes a communication line 51. The communication line 51 provides fluid communication between the refrigerant line 21, through which refrigerant flows between the compressor 12 and the heat exchanger 14, and the refrigerant line 36 on the downstream side of the cooling portion 30 between the refrigerant lines 34 and 36 that flow refrigerant through the cooling portion 30. The refrigerant line 36 is divided into a refrigerant line 36a on the upstream side of a branching portion from the communication line 51 and a refrigerant line 36b on the downstream side of the branching portion from the communication line 51.

A selector valve 52 is provided in the refrigerant line 36 and the communication line 51. The selector valve 52 switches the state of fluid communication between the communication line 51 and the refrigerant lines 21 and 36. The selector valve 52 switches between the open state and the closed state to thereby allow or interrupt flow of refrigerant via the communication line 51. By switching the path of refrigerant with the use of the selector valve 52, it is possible to cause refrigerant after cooling the EV device 31 to flow to any selected one of the paths, that is, to the heat exchanger 15 via the refrigerant lines 36b and 24 or to the heat exchanger 14 via the communication line 51 and the refrigerant line 21.

More specifically, two valves 57 and 58 are provided as the selector valve 52. During cooling operation of the vapor compression refrigeration cycle 10, the valve 57 is fully open (valve opening degree 100%) and the valve 58 is fully closed (valve opening degree 0%), and the valve opening degree of the flow regulating valve 28 is adjusted such that a sufficient amount of refrigerant flows through the cooling portion 30. By so doing, it is possible to reliably cause refrigerant flowing through the refrigerant line 36a after cooling the EV device 31 to flow to the heat exchanger 15 via the refrigerant line 36b.

On the other hand, during a stop of the vapor compression refrigeration cycle 10, the valve 58 is fully open and the valve 57 is fully closed, and, furthermore, the flow regulating valve 28 is fully closed. By so doing, it is possible to cause refrigerant flowing through the refrigerant line 36a after cooling the EV device 31 to flow to the heat exchanger 14 via the communication line 51, thus making it possible to form an annular path that causes refrigerant to circulate between the cooling portion 30 and the heat exchanger 14 without passing through the compressor 12.

Figure 4:
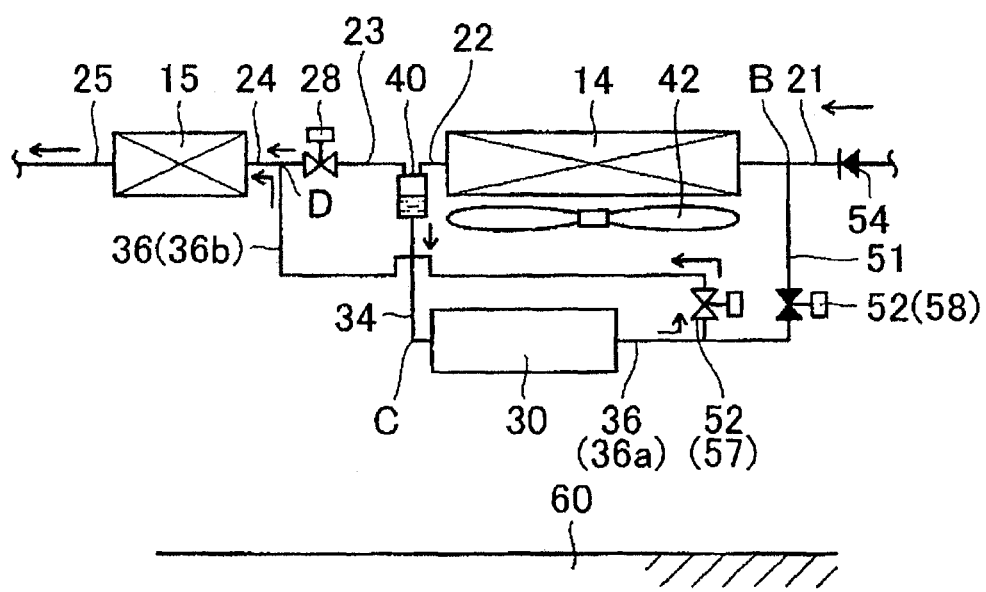
FIG. 4 is a schematic view that shows the flow of refrigerant that cools an EV device during operation of the vapor compression refrigeration cycle.
Figures 5, 6:
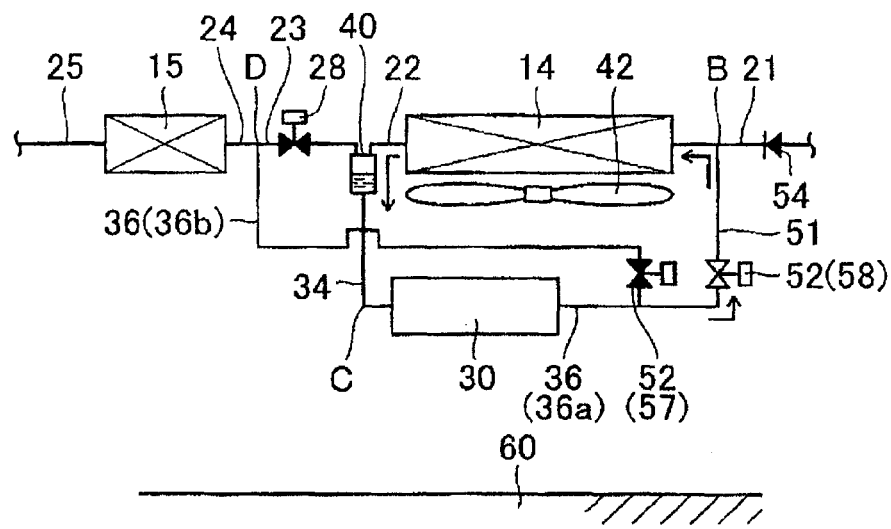
FIG. 5 is a schematic view that shows the flow of refrigerant that cools the EV device during a stop of the vapor compression refrigeration cycle.
FIG. 6 is a view that shows an opening degree of a flow regulating valve and an opening degree of a selector valve in each operation mode of the cooling system.

FIG. 4 is a schematic view that shows flow of refrigerant that cools the EV device 31 during operation of the vapor compression refrigeration cycle 10. FIG. 5 is a schematic view that shows flow of refrigerant that cools the EV device 31 during a stop of the vapor compression refrigeration cycle 10. FIG. 6 is a view that shows an opening degree of the flow regulating valve 28 and an opening degree of the selector valve 52 (valves 57 and 58) in each operation mode of the cooling system 1. An "air-conditioner operation mode" among the operation modes shown in FIG. 6 indicates the case where the vapor compression refrigeration cycle 10 is operated as shown in FIG. 4, that is, the case where the compressor 12 is operated to flow refrigerant through the whole of the vapor compression refrigeration cycle 10. On the other hand, a "heat pipe operation mode" indicates the case where the vapor compression refrigeration cycle 10 is stopped as shown in FIG. 5, that is, the case where the compressor 12 is stopped to circulate refrigerant via the annular path that connects the cooling portion 30 to the heat exchanger 14.

As shown in FIG. 4 and FIG. 6, during "air-conditioner operation mode" in which the compressor 12 is driven and the vapor compression refrigeration cycle 10 is operated, the flow regulating valve 28 is adjusted in valve opening degree such that a sufficient amount of refrigerant flows through the cooling portion 30. The selector valve 52 is operated so as to flow refrigerant from the cooling portion 30 to the expansion valve 16 via the heat exchanger 15. That is, as the valve 57 is fully open and the valve 58 is fully closed, the path of refrigerant that causes refrigerant to flow through the whole of the cooling system 1 is selected. Therefore, it is possible to ensure the cooling performance of the vapor compression refrigeration cycle 10, and it is possible to efficiently cool the EV device 31.

As shown in FIG. 5 and FIG. 6, during "heat pipe operation mode" in which the compressor 12 is stopped and the vapor compression refrigeration cycle 10 is stopped, the selector valve 52 is operated so as to circulate refrigerant from the cooling portion 30 to the heat exchanger 14. That is, as the valve 57 is fully closed, the valve 58 is fully open and the flow regulating valve 28 is fully closed, refrigerant does not flow from the refrigerant line 36a to the refrigerant line 36b but flows from the refrigerant line 36a via the communication line 51. By so doing, a closed annular path is formed. The closed annular path is routed from the heat exchanger 14 to the cooling portion 30 via the refrigerant line 22 and the refrigerant line 34 sequentially, further passes through the refrigerant line 36a, the communication line 51 and the refrigerant line 21 sequentially and returns to the heat exchanger 14. The path through which refrigerant flows at this time, that is, the refrigerant line 21, the refrigerant line 22, the refrigerant line 34, the refrigerant line 36a and the communication line 51, forms a second line.

Refrigerant may be circulated between the heat exchanger 14 and the cooling portion 30 via the annular path without operating the compressor 12. When refrigerant cools the EV device 31, the refrigerant receives latent heat of vaporization from the EV device 31 to evaporate. Refrigerant steam vaporized by exchanging heat with the EV device 31 flows to the heat exchanger 14 via the refrigerant line 36a, the communication line 51 and the refrigerant line 21 sequentially. In the heat exchanger 14, refrigerant steam is cooled to condense by travelling wind of the vehicle or draft from the condenser fan 42 or the engine cooling radiator fan. Refrigerant liquid liquefied in the heat exchanger 14 returns to the cooling portion 30 via the refrigerant lines 22 and 34.

In this way, a heat pipe in which the EV device 31 serves as a heating portion and the heat exchanger 14 serves as a cooling portion is formed by the annular path that passes through the cooling portion 30 and the heat exchanger 14. Thus, when the vapor compression refrigeration cycle 10 is stopped, that is, when a cooler for the vehicle is stopped as well, the EV device 31 may be reliably cooled without the necessity of start of the compressor 12. Because the compressor 12 is not required to constantly operate in order to cool the EV device 31, the power consumption of the compressor 12 is reduced to thereby make it possible to improve the fuel economy of the vehicle and, in addition, to extend the life of the compressor 12, so it is possible to improve the reliability of the compressor 12.

FIG. 4 and FIG. 5 show a ground 60. The cooling portion 30 is arranged below the heat exchanger 14 in the vertical direction perpendicular to the ground 60. In the annular path that circulates refrigerant between the heat exchanger 14 and the cooling portion 30, the cooling portion 30 is arranged below, and the heat exchanger 14 is arranged above. The heat exchanger 14 is arranged at the level higher than the cooling portion 30.

In this case, refrigerant steam heated and vaporized in the cooling portion 30 goes up in the annular path, reaches the heat exchanger 14, is cooled in the heat exchanger 14, condenses into liquid refrigerant, goes down in the annular path by the action of gravity and returns to the cooling portion 30. That is, a thermo-siphon heat pipe is formed of the cooling portion 30, the heat exchanger 14 and the refrigerant paths (that is, the second line) that connect them. Because the heat transfer efficiency from the EV device 31 to the heat exchanger 14 may be improved by forming the heat pipe, when the vapor compression refrigeration cycle 10 is stopped as well, the EV device 31 may be further efficiently cooled without additional power.

The selector valve 52 that switches the state of fluid communication between the communication line 51 and the refrigerant lines 21 and 36 may be the above-described pair of valves 57 and 58 or may be a three-way valve that is arranged at the branching portion between the refrigerant line 36 and the communication line 51. In any cases, during both operation and stop of the vapor compression refrigeration cycle 10, it is possible to efficiently cool the EV device 31. The valves 57 and 58 just need to have a simple structure so as to be able to open or close the refrigerant line, so the valves 57 and 58 are not expensive, and the two valves 57 and 58 are used to make it possible to provide the cooling system 1 at further low cost. On the other hand, it is presumable that a space required to arrange the three-way valve is smaller than a space required to arrange the two valves 57 and 58, and the three-way valve is used to make it possible to provide the cooling system 1 having a further reduced size and excellent vehicle mountability.

The cooling system 1 further includes a check valve 54. The check valve 54 is arranged in the refrigerant line 21 between the compressor 12 and the heat exchanger 14 on the side closer to the compressor 12 than the connection portion between the refrigerant line 21 and the communication line 51. The check valve 54 allows flow of refrigerant from the compressor 12 toward the heat exchanger 14 and prohibits flow of refrigerant in the opposite direction. By so doing, during the heat pipe operation mode shown in FIG. 5, it is possible to reliably form a closed loop path of refrigerant for circulating refrigerant between the heat exchanger 14 and the cooling portion 30.

When no check valve 54 is provided, refrigerant may flow from the communication line 51 to the refrigerant line 21 adjacent to the compressor 12. By providing the check valve 54, it is possible to reliably prohibit flow of refrigerant from the communication line 51 toward the side adjacent to the compressor 12, so it is possible to prevent a decrease in the cooling performance for cooling the EV device 31 with the use of the heat pipe that forms the annular refrigerant path during a stop of the vapor compression refrigeration cycle 10. Thus, when the cooler for the cabin of the vehicle is stopped as well, it is possible to efficiently cool the EV device 31.

In addition, when the amount of refrigerant in the closed loop path of refrigerant is insufficient during a stop of the vapor compression refrigeration cycle 10, the compressor 12 is operated only in a short period of time to thereby make it possible to supply refrigerant to the closed loop path via the check valve 54. By so doing, the amount of refrigerant in the closed loop is increased to thereby make it possible to increase the amount of heat exchanged by the heat pipe. Thus, it is possible to ensure the amount of refrigerant in the heat pipe, so it is possible to avoid insufficient cooling of the EV device 31 due to an insufficient amount of refrigerant.

Figure 7:
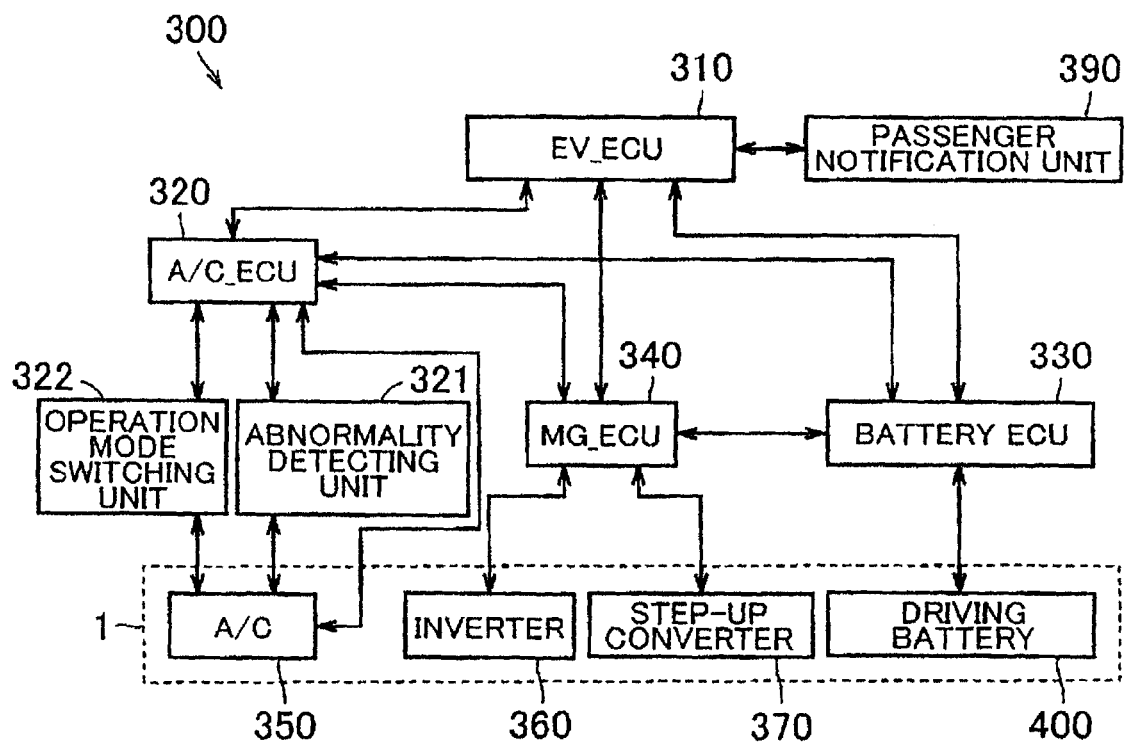
FIG. 7 is a block diagram that shows the details of the configuration of a control device according to the first embodiment.

Hereinafter, control over the cooling system 1 according to the present embodiment will be described. FIG. 7 is a block diagram that shows the details of the configuration of a control device 300 according to the first embodiment. The control device 300 shown in FIG. 7 includes an EV_electronic control unit (ECU) 310, an A/C_ECU 320, a motor generator (MG)_ECU 340, a battery ECU 330 and a passenger notification unit 390. The EV_ECU 310 governs all the control units of an electric vehicle. The A/C_ECU 320 controls an air conditioner (A/C) 350. The MG_ECU 340 controls the drive unit, such as an inverter 360 and a step-up converter 370, for causing the vehicle to travel. The battery ECU 330 controls the driving battery 400. The passenger notification unit 390 notifies a passenger of the electric vehicle of an abnormality.

The inverter 360 and the step-up converter 370 are included in the drive unit 200 shown in FIG. 1. The inverter 360, the step-up converter 370 and the driving battery 400 are included in the EV device 31 that serves as the heat generating source shown in FIG. 2. The EV device 31 that includes the inverter 360, the step-up converter 370 and the driving battery 400 is cooled by the cooling system 1 that utilizes the vapor compression refrigeration cycle 10 used in the air conditioner 350 as described above.

The A/C_ECU 320 outputs a signal that instructs the compressor 12 to start or stop. The A/C_ECU 320 functions as a compressor control unit that controls start and stop of the compressor 12.

The control device 300 further includes an abnormality detecting unit 321 that detects an abnormality of the operating state of the cooling system 1. The abnormality detecting unit 321 is provided so as to be able to detect an abnormality of the compressor 12. An abnormality of the compressor 12 is detected as follows. The A/C_ECU 320 monitors, for example, a rotation speed abnormality, an eddy current abnormality, an abnormality of air temperature at an air outlet into the cabin of the vehicle, or the like. The A/C_ECU 320 functions as an air-conditioning air temperature determining unit that determines whether the temperature of air-conditioning air is higher or lower than a predetermined temperature.

The abnormality detecting unit 321 is provided so as to be able to detect an abnormality of the flow rate of refrigerant supplied to the cooling portion 30 during operation of the compressor 12. An abnormality of the flow rate of refrigerant, that is, a shortage of refrigerant, is detected as follows. The A/C_ECU 320 monitors, for example, insufficient cooling performance, an air outlet temperature abnormality, an abnormality of the pressure or temperature of the refrigeration cycle, insufficient cooling performance for cooling the EV device 31, an abnormality of the liquid level of the gas-liquid separator 40, an abnormality of the temperature of the EV device 31, or the like. The A/C_ECU 320 functions as a refrigerant amount determining unit that determines whether the amount of refrigerant in the gas-liquid separator 40 is larger than or smaller than a predetermined amount.

The control device 300 further includes an operation mode switching unit 322 that switches the operation mode of the cooling system 1. The operation mode switching unit 322 functions as a selector valve control unit and a flow regulating valve control unit. The selector valve control unit controls the open/close state of the selector valve 52. The flow regulating valve control unit controls the opening degree of the flow regulating valve 28. The operation mode switching unit 322 outputs a signal that instructs the flow regulating valve 28 on its opening degree and a signal that instructs the selector valve 52 (valves 57 and 58) on its open/close state.

Figure 8:
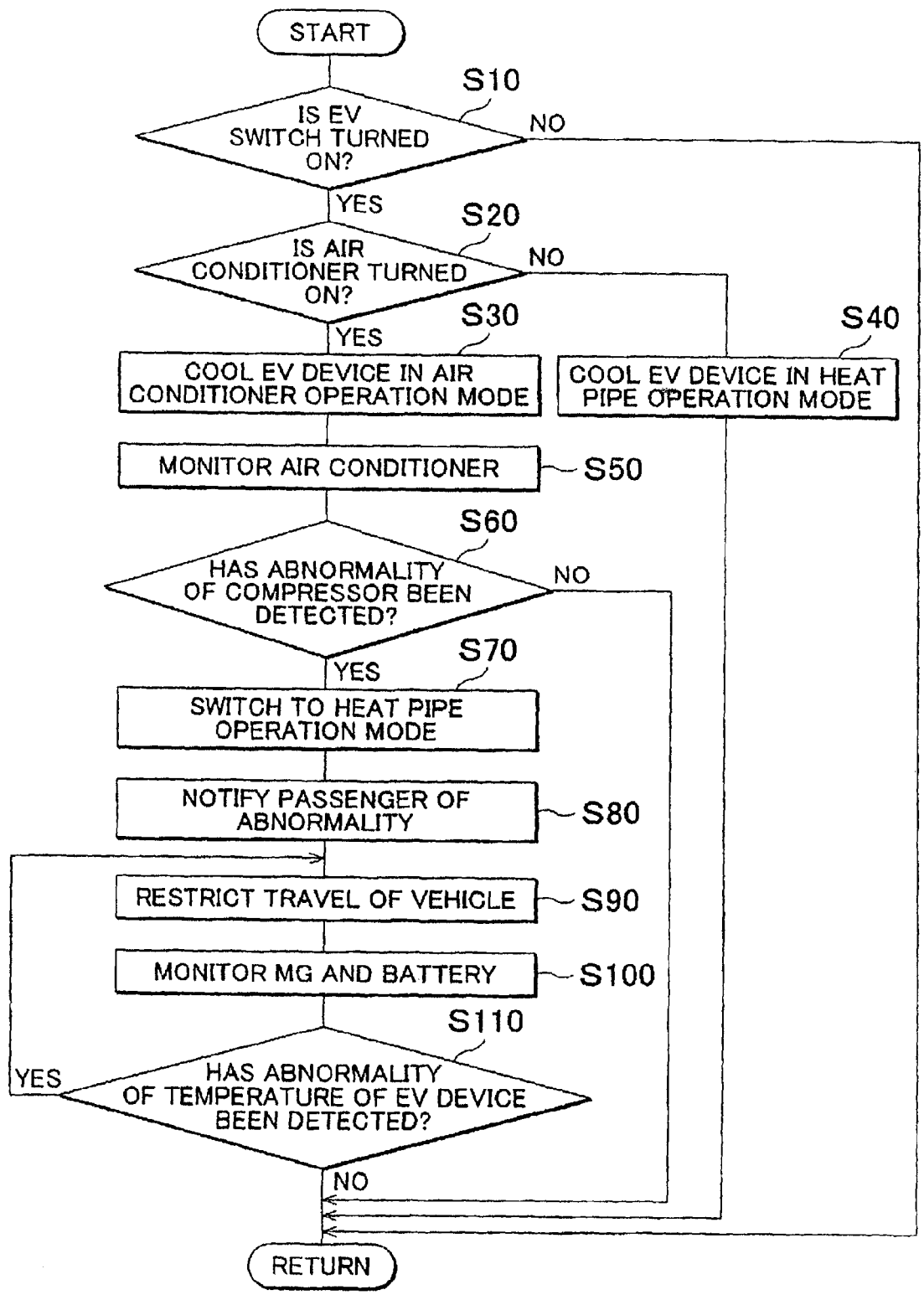
FIG. 8 is a flowchart that shows an example of a control method for the cooling system according to the first embodiment.

FIG. 8 is a flowchart that shows an example of a control method for the cooling system 1. As shown in FIG. 8, first, in step S10, it is determined whether an EV switch is turned on by a driver of the electric vehicle. When the EV switch is not turned on and is in an off state, the control flow is returned, and is set in a standby state. When the EV switch is turned on, the electric vehicle is caused to start travelling. As the electric vehicle travels, power devices, such as the inverter 360 and the step-up converter 370, generate heat. In addition, the driving battery 400 is discharged and charged by a chemical reaction. The chemical reaction generates heat, so the driving battery 400 generates heat. Therefore, it is required to cool the EV device 31 that includes the inverter 360, the step-up converter 370 and the driving battery 400.

Subsequently, in step S20, it is determined whether the air conditioner is turned on. The on/off state of the air conditioner is switched by a passenger as follows. The passenger operates an air-conditioning control panel provided on an instrument panel at the front of the cabin of the electric vehicle.

When it is determined in step S20 that the air conditioner is in an off state, a control command that instructs the compressor 12 to stop is transmitted from the A/C_ECU 320 to the A/C 350, and the compressor 12 is stopped. In this case, the control flow proceeds to step S40, and the cooling system 1 cools the EV device 31 in the heat pipe operation mode.

That is, a signal that instructs the selector valve 52 on its open/close state is transmitted to the selector valve 52 (valves 57 and 58), and a signal that instructs the flow regulating valve 28 on its opening degree is transmitted to the flow regulating valve 28. By so doing, the valve 57 is fully closed, the valve 58 is fully opened, and the flow regulating valve 28 is fully closed. Thus, the annular path that circulates refrigerant is formed between the cooling portion 30 and the heat exchanger 14 to form a thermo-siphon heat pipe. Liquid refrigerant cooled in the heat exchanger 14 is caused to flow to the cooling portion 30 by the action of gravity, and heat is exchanged between the EV device 31 and refrigerant flowing through the cooling line 32. By so doing, the EV device 31 is cooled. Refrigerant steam heated and vaporized in the cooling portion 30 goes up in the annular path, and reaches the heat exchanger 14 again.

When the EV device 31 is cooled in the heat pipe operation mode, the control flow is returned, and then determination as to whether the EV switch is turned on or off in step S10 and determination as to whether the air conditioner is turned on or off in step S20 are continued.

When it is determined in step S20 that the air conditioner is turned on, a control command that instructs the compressor 12 to start is transmitted from the A/C_ECU 320 to the A/C 350, and the compressor 12 is started in order to circulate refrigerant through the whole of the vapor compression refrigeration cycle 10. In this case, in the next step S30, the cooling system 1 cools the EV device 31 in the air-conditioner operation mode.

That is, a signal that instructs the selector valve 52 on its open/close state is transmitted to the selector valve 52 (valves 57 and 58), and a signal that instructs the flow regulating valve 28 on its opening degree is transmitted to the flow regulating valve 28. By so doing, the valve 57 is fully opened, the valve 58 is fully closed, and the opening degree of the flow regulating valve 28 is adjusted. Thus, within refrigerant discharged from the compressor 12, a sufficient amount of refrigerant for cooling the EV device 31 is caused to flow to the cooling portion 30. Refrigerant subjected to heat exchange with outside air and cooled in the heat exchanger 14 is caused to flow to the cooling portion 30, and heat is exchanged between the EV device 31 and refrigerant flowing through the cooling line 32. By so doing, the EV device 31 is cooled.

Note that, other than the case where the passenger of the electric vehicle operates the control panel to turn on the air conditioner, the EV device 31 may be cooled in the air-conditioner operation mode when it is determined by the control device 300 that it is required to cool the EV device 31 in the air-conditioner operation mode. For example, when an outside air temperature is higher than a predetermined temperature (for example, 25° C.), when an air-conditioning air temperature is higher than a predetermined temperature (for example, 20° C.) or when the amount of refrigerant liquid in the gas-liquid separator 40 is smaller than a predetermined amount, a control command that instructs the compressor 12 to start may be transmitted from the A/C_ECU 320 to the A/C 350. The A/C_ECU 320 may function as an outside air temperature determining unit that measures the temperature of outside air.

Alternatively, when the electric vehicle travels under a situation that the amount of heat generated by the EV device 31 is large, such as during travelling on an uphill, as well, the EV device 31 may be cooled in the air-conditioner operation mode. Cooling performance of the cooling system 1 for cooling the EV device 31 is relatively higher in the air-conditioner operation mode in which the compressor 12 is operated than in the heat pipe operation mode. Therefore, when the amount of heat generated by the EV device 31 is large, the cooling system 1 is operated in the air-conditioner operation mode to cool the EV device 31. By so doing, it is possible to reliably prevent overheating of the EV device 31. The situation under which the electric vehicle travels may be determined by monitoring, for example, the temperatures of the devices included in the PCU 700, the temperature of the substrate of the PCU 700, a current value supplied to the PCU 700, a torque value of the motor generator included in the drive unit 200, or the like.

When the EV device 31 is cooled in the air-conditioner operation mode in step S30, the air conditioner is monitored in the next step S50. For example, as described above, the A/C_ECU 320 monitors whether there is an abnormality of the compressor 12, such as a rotation speed abnormality, an eddy current abnormality and an air temperature abnormality at the air outlet into the cabin of the vehicle.

Subsequently, in step S60, it is determined whether an abnormality of the compressor 12 has been detected. When an abnormality of the compressor 12 has not been detected, the control flow is returned, and then determination as to whether the EV switch is turned on or off in step S10 and determination as to whether the air conditioner is turned on or off in step S20 are continued.

When an abnormality of the compressor 12 has been detected in step S60, the control flow proceeds to step S70, and the operation mode for cooling the EV device 31 is switched from the air-conditioner operation mode to the heat pipe operation mode. That is, the compressor 12 is stopped, and the valve 57 is fully closed. By so doing, the first line that flows refrigerant, discharged from the compressor 12, to the cooling portion 30 to cool the EV device 31 is interrupted. In addition, the flow regulating valve 28 is fully closed, and the valve 58 is fully opened. By so doing, the second line that circulates refrigerant between the heat exchanger 14 and the cooling portion 30 owing to natural circulation is communicated, so it is possible to supply refrigerant to the cooling portion 30 without passing through the compressor 12.

The open/close state of the selector valve 52 is switched to switch between fluid communication of the first line and fluid communication of the second line. By so doing, the operation mode of the cooling system 1 for cooling the EV device 31 is switched from the air-conditioner operation mode in which the first line is communicated (the fluid communication of the first line is allowed) and the second line is interrupted to the heat pipe operation mode in which the first line is interrupted and the second line is communicated (the fluid communication of the second line is allowed, that is, the refrigerant is allowed to circulate through the second line). In this way, when an abnormality of the compressor 12 has occurred as well, cooling performance of the cooling system 1 for cooling the EV device 31 is maintained.

Subsequently, in step S80, the passenger of the electric vehicle is notified of the abnormality of the compressor 12. Specifically, a signal is transmitted from the EV_ECU 310 to the passenger notification unit 390. By so doing, the passenger notification unit 390 appropriately activates a device required to notify the passenger of the abnormality of the compressor 12. For example, the passenger may be visually notified of the abnormality by, for example, indicating the abnormality on the instrument panel adjacent to the front of the vehicle, or may be auditorily notified of the abnormality by, for example, beeping a buzzer or announcing that "abnormality has occurred". Alternatively, the passenger may also be notified of the abnormality by applying vibrations to the passenger, suddenly closing the air outlet of the A/C, forcibly stopping a blower fan, or the like.

Subsequently, in step S90, the travelling state of the vehicle is restricted. Specifically, the travelling condition of the electric vehicle is restricted by restricting the amount of heat generated by the EV device 31, such as the inverter 360, the step-up converter 370 and the driving battery 400, so that the temperature of the EV device 31 is not higher than or equal to a reference temperature (i.e., the temperature of the EV device 31 is lower than a reference temperature). Travel of the vehicle is restricted by transmitting signals respectively from the MG_ECU 340 and the battery ECU 330 to the corresponding components of the EV device 31. For example, the travelling state of the electric vehicle is restricted so that the electric vehicle cannot be driven at a sudden acceleration or a speed higher than a predetermined value. In addition, for example, information about a travel route of the electric vehicle is acquired with the user of a global positioning system (GPS) and then the travel route of the electric vehicle is restricted so that the electric vehicle does not travel at an uphill angle that exceeds a predetermined value.

Subsequently, in step S100, the EV device 31, such as the MG and the driving battery 400, is monitored. Specifically, the temperature of the EV device 31 is monitored to monitor whether the amount of heat generated by the EV device 31 increases and the EV device 31 is overheated while the electric vehicle is travelling.

Subsequently, in step S110, it is determined whether an abnormality of the temperature of the EV device 31 has been detected. When an abnormality of the temperature of the EV device 31 has not been detected, the control flow is returned, and then determination as to whether the EV switch is turned on or off in step S10 is made and, after that, determination as to whether the air conditioner is turned on or off in step S20 is made. The air conditioner is in an off state at this time, so the control flow proceeds to step S40 after step S20. Then, the control flow is returned again, and returns to determination in step S10.

When an abnormality of the temperature of the EV device 31 has been detected in step S110, the control flow returns to step S90, and travel of the vehicle is further restricted. For example, an acceleration or maximum speed of the electric vehicle or an uphill angle in a travel route is further restricted. By so doing, the amount of heat generated by the EV device 31 is further restricted. After that, through step S100, determination in step S110 is made again. When an abnormality of the temperature of the EV device 31 has been detected in step S110 again, travel of the vehicle is further restricted.

As a result of repetition of restricting travel of the vehicle in step S90 and determination in step S110, when the temperature of the EV device 31 becomes lower than or equal to a predetermined value, the control flow is returned. When the temperature of the EV device 31 is not lower than or equal to the predetermined value, finally, the maximum speed of the electric vehicle is set to 0 km per hour. That is, travel of the electric vehicle is prohibited.

As described above, the cooling system 1 according to the present embodiment is able to cool the EV device 31 that serves as the heat generating source in both operation modes, that is, the "air-conditioner operation mode" in which the compressor 12 is driven and the "heat pipe operation mode" in which the compressor 12 is stopped. In the heat pipe operation mode, it is possible to reliably cool the EV device 31 without the necessity of starting the compressor 12, so it is not required to constantly operate the compressor 12 in order to cool the EV device 31. Therefore, it is possible to improve the fuel economy of the vehicle by reducing the power consumption of the compressor 12 and, in addition, it is possible to extend the life of the compressor 12, so it is possible to improve the reliability of the compressor 12.

The open/close state of the selector valve 52 is controlled in coordination with start or stop of the compressor 12 for switching the operation mode of the cooling system 1. By so doing, it is possible to further reliably switch between the air-conditioner operation mode and the heat pipe operation mode, and to flow refrigerant to an appropriate path in each operation mode.

The operation mode of the cooling system 1 may be switched as follows. The passenger of the electric vehicle manually operates the control panel to switch the on/off state of the air conditioner. When air conditioning in the vehicle cabin is not required, the passenger turns off the air conditioner to switch the operation mode of the cooling system 1 so that the EV device 31 is cooled in the heat pipe operation mode. When the heat pipe operation mode is selected, the compressor 12 stops, so it is possible to further reduce the operating time of the compressor 12. As a result, it is possible to further remarkably obtain advantageous effects that a reduction in the power consumption of the compressor 12 and improvement in the reliability of the compressor 12.

The operation mode of the cooling system 1 is automatically switched to the heat pipe operation mode when an abnormality of the compressor 12 has been detected in the air-conditioner operation mode in which the compressor 12 is operated. By so doing, when an abnormality has occurred in the compressor 12, it is possible to continuously cool the EV device 31 owing to the heat pipe operation mode, so it is possible to keep the EV device 31 in an appropriately cooled state. Thus, it is possible to prevent overheating of the EV device 31 and, as a result, poor operation of the EV device 31 at the time of a failure of the compressor 12, so it is possible to allow the electric vehicle to travel at a certain distance even after the compressor 12 has failed.

By restricting the travelling state of the electric vehicle when an abnormality of the compressor 12 has been detected, the amount of heat generated from the EV device 31 that operates as the driving source of the electric vehicle is reduced. By so doing, it is possible to further reliably avoid overheating of the EV device 31. In addition, when an abnormality of the compressor 12 has been detected, the passenger of the electric vehicle is notified of the abnormality and is able to reliably recognize that an abnormality has occurred in the compressor 12, so the driver of the electric vehicle is able to early and safely stop the electric vehicle.

Figure 9:
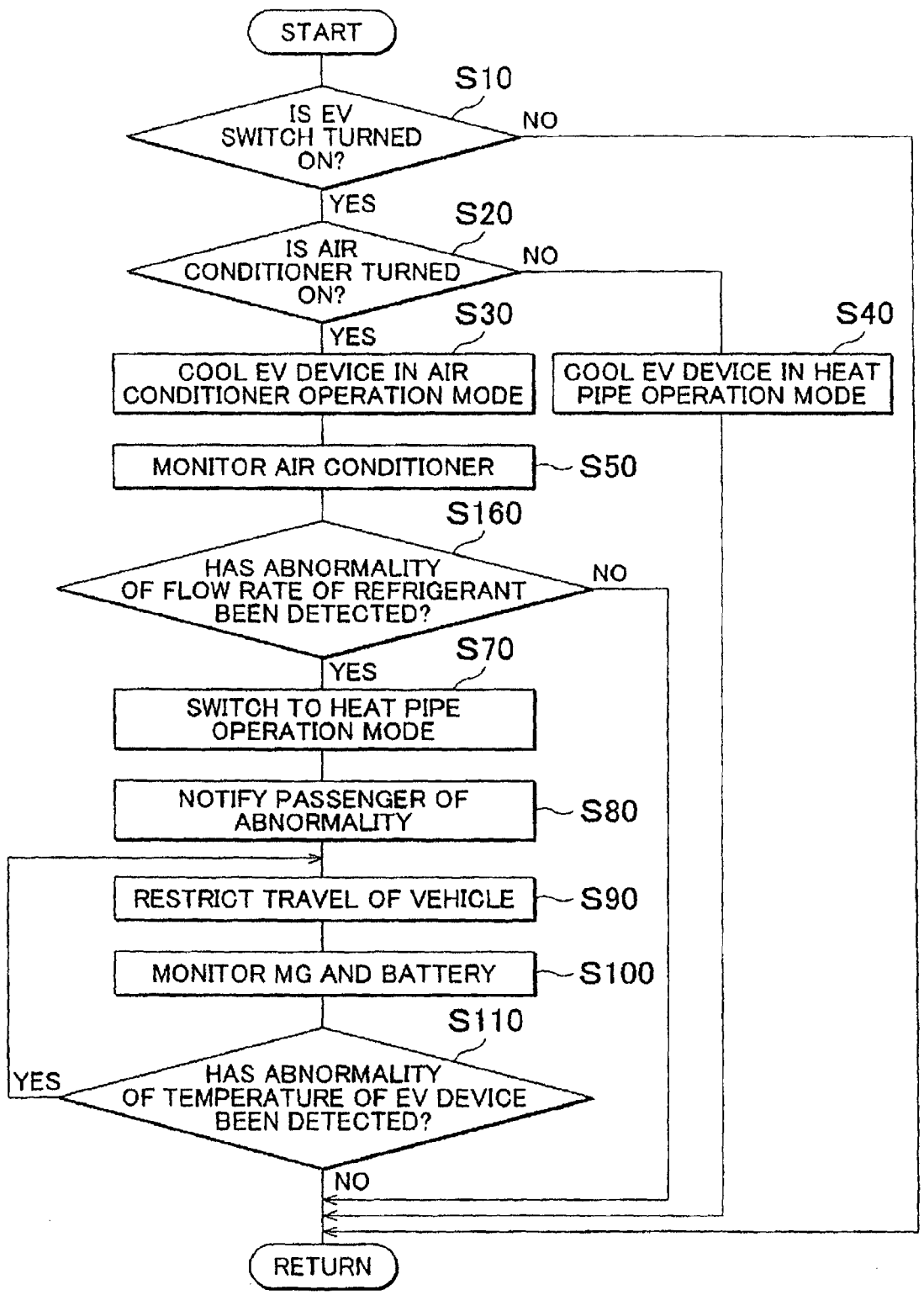
FIG. 9 is a flowchart that shows another example of a control method for the cooling system according to the first embodiment.

FIG. 9 is a flowchart that shows another example of a control method for the cooling system 1 according to the first embodiment. In comparison with FIG. 8, in the example shown in FIG. 9, instead of step S60 of determining whether an abnormality of the compressor 12 has been detected, step S160 of determining whether an abnormality of the flow rate of refrigerant supplied to the cooling portion 30 during operation of the compressor 12 has been detected is included.

In this case, in monitoring the air conditioner in step S50, the A/C_ECU 320 monitors, for example, insufficient cooling performance, an air outlet temperature abnormality, an abnormality of the pressure or temperature of the refrigeration cycle, insufficient cooling performance for cooling the EV device 31, an abnormality of the liquid level of the gas-liquid separator 40, an abnormality of the temperature of the EV device 31, or the like, to thereby monitor an abnormality of the flow rate of refrigerant, that is, a shortage of the flow rate of refrigerant. Subsequently, in step S160, it is determined whether an abnormality of the flow rate of refrigerant has been detected. When an abnormality has not been detected, the control flow is returned. When an abnormality of the flow rate of refrigerant has been detected in step S160, the control flow proceeds to step S70, and the operation mode for cooling the EV device 31 is switched from the air-conditioner operation mode to the heat pipe operation mode.

The other steps are the same as those of the example described with reference to FIG. 8, so the description thereof is not repeated.

When an abnormality of the flow rate of refrigerant has been detected in the air-conditioner operation mode in which the compressor 12 is operated, the operation mode of the cooling system 1 is automatically switched to the heat pipe operation mode. By so doing, when the flow rate of refrigerant for cooling the EV device 31 is short, it is possible to continuously cool the EV device 31 owing to the heat pipe operation mode, so it is possible to keep the EV device 31 in an appropriately cooled state. Thus, it is possible to prevent overheating of the EV device 31 and, as a result, poor operation of the EV device 31, so it is possible to allow the electric vehicle to travel at a certain distance and to stop safely.

Second Embodiment

Figure 10:
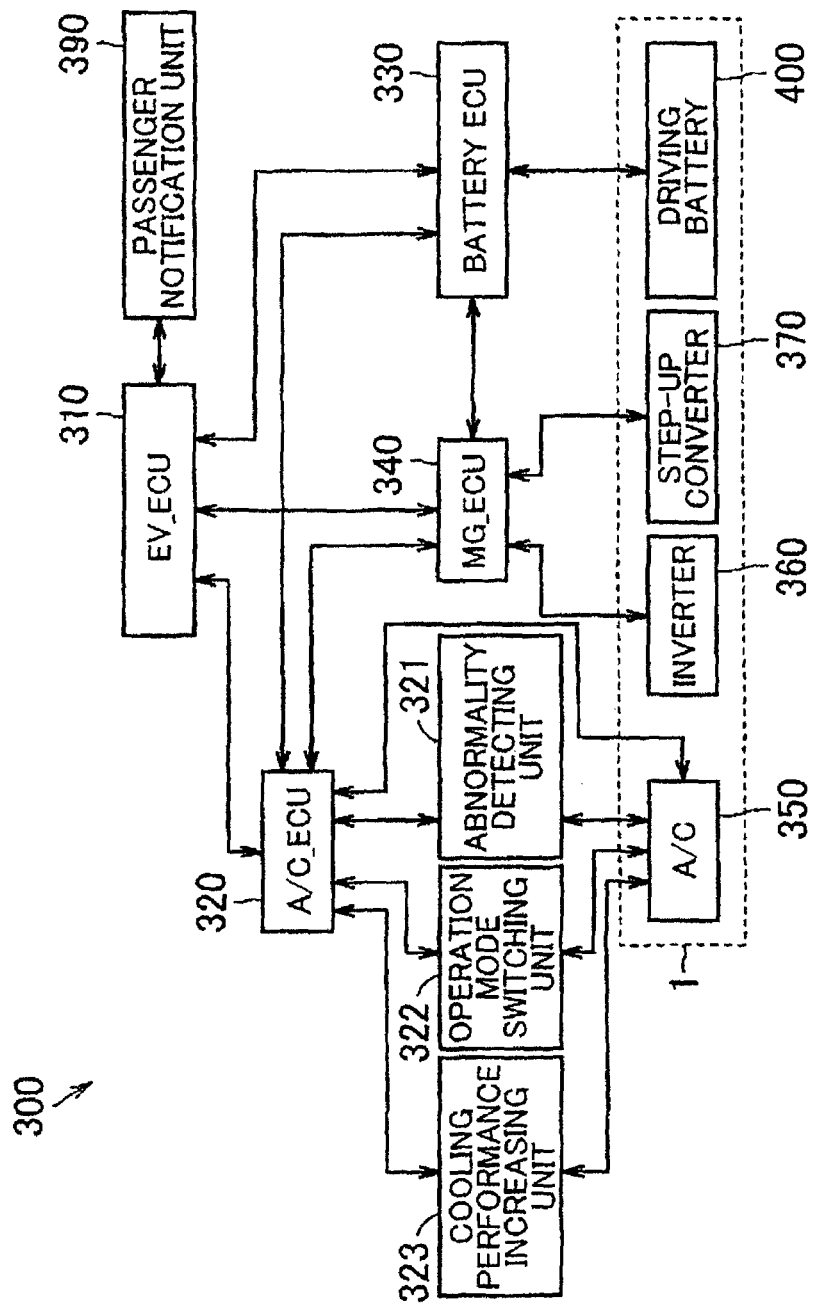
FIG. 10 is a block diagram that shows the details of the configuration of a control device according to a second embodiment.

FIG. 10 is a block diagram that shows the details of the configuration of a control device 300 according to a second embodiment. The control device 300 shown in FIG. 10 differs from the control device according to the first embodiment, described with reference to FIG. 7, in that a cooling performance increasing unit 323 for increasing cooling performance for cooling the EV device 31 is further included.

The cooling performance increasing unit 323 may, for example, transmit a control signal to the condenser fan 42. In this case, the cooling performance increasing unit 323 that has received a command to increase cooling performance for cooling the EV device 31 from the A/C_ECU 320 may increase the rotation speed of the condenser fan 42 to increase the amount of air supplied to the heat exchanger 14. When the amount of air supplied to the heat exchanger 14 is increased, the amount of heat exchanged between refrigerant and outside air in the heat exchanger 14 is increased to thereby make it possible to further cool refrigerant in the heat exchanger 14. As a result, the amount of refrigerant in a saturated liquid state, stored in the gas-liquid separator 40, is increased to thereby make it possible to supply a larger amount of liquid refrigerant to the cooling portion 30, so it is possible to increase cooling performance for cooling the EV device 31.

Figure 11:
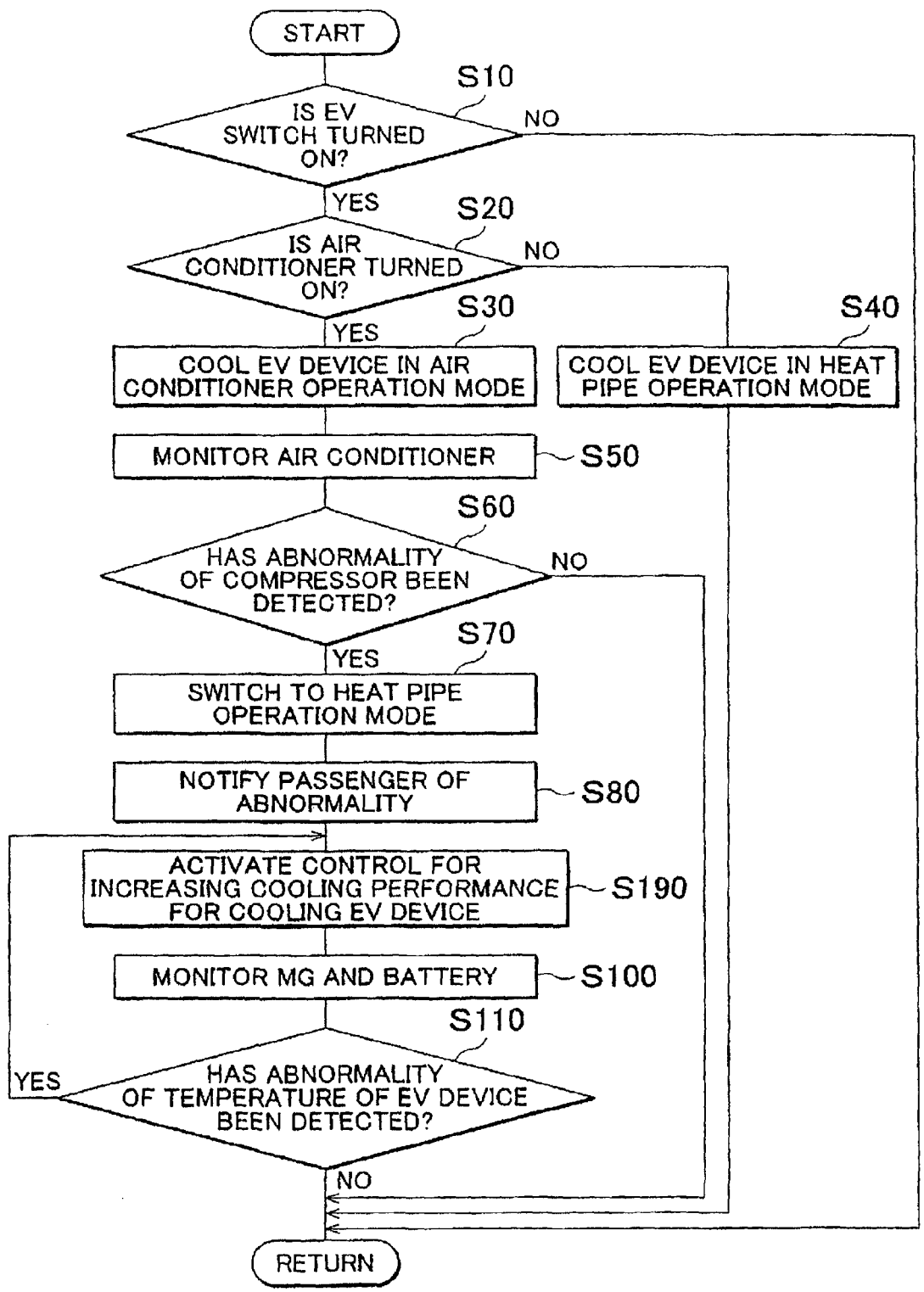
FIG. 11 is a flowchart that shows an example of a control method for the cooling system according to the second embodiment.

FIG. 11 is a flowchart that shows an example of a control method for the cooling system 1 according to the second embodiment. As shown in FIG. 11, in the second embodiment, instead of step S90 of restricting travel of the vehicle in the first embodiment, step S190 of activating control for increasing cooling performance for cooling the EV device 31 is included. In step S190, a control signal is transmitted to the condenser fan 42 to increase the rotation speed of the condenser fan 42 to thereby increase the amount of air supplied to the heat exchanger 14. By so doing, refrigerant is further cooled in the heat exchanger 14 to increase the amount of refrigerant stored in the gas-liquid separator 40, and a larger amount of liquid refrigerant is supplied to the cooling portion 30. Thus, cooling performance for cooling the EV device 31 increases.

In determination of step S110 thereafter, when an abnormality of the temperature of the EV device 31 has been detected, the control flow returns to step S190, and then control for further increasing cooling performance for cooling the EV device 31 is activated. For example, the rotation speed of the condenser fan 42 is further increased to further increase the amount of air supplied to the heat exchanger 14. By so doing, heat is further efficiently removed from the EV device 31. After that, through step S100, determination in step S110 is made again. When an abnormality of the temperature of the EV device 31 has been detected in step S110 again, cooling performance for cooling the EV device 31 is further increased.

As a result of repetition of increasing cooling performance for cooling the EV device 31 in step S190 and determination in step S110, when the temperature of the EV device 31 is lower than or equal to a predetermined value, the control flow is returned. When the temperature of the EV device 31 is not lower than or equal to the predetermined value, finally, it is determined that the amount of heat generated by the EV device 31 is excessive against cooling performance for cooling the EV device 31 in the heat pipe operation mode, so travel of the electric vehicle is prohibited.

The other steps are the same as those of the example described with reference to FIG. 8, so the description thereof is not repeated.

As described above, the control device 300 for the cooling system 1 according to the second embodiment increases cooling performance for cooling the EV device 31 when an abnormality of the compressor 12 has been detected to thereby improve the amount of heat dissipated from the EV device 31 that operates as the driving source of the electric vehicle. By so doing, it is possible to control the cooling system 1 so that the temperature of the EV device 31 is not higher than or equal to a reference temperature, so it is possible to further reliably avoid overheating of the EV device 31.

Figure 12:
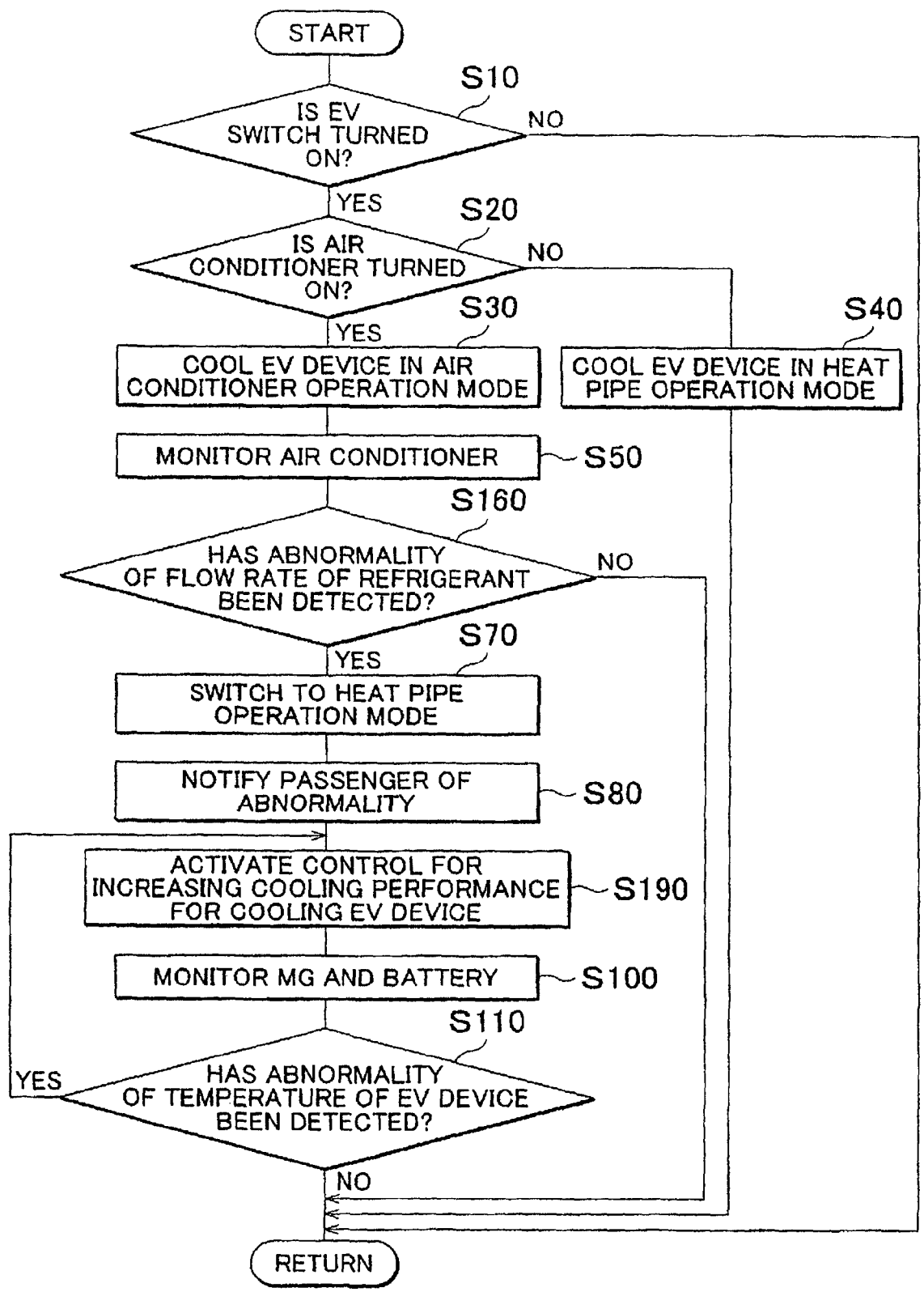
FIG. 12 is a flowchart that shows another example of a control method for the cooling system according to the second embodiment.

FIG. 12 is a flowchart that shows another example of a control method for the cooling system 1 according to the second embodiment. In comparison with FIG. 11, in the example shown in FIG. 12, instead of step S60 of determining whether an abnormality of the compressor 12 has been detected, step S160 of determining whether an abnormality of the flow rate of refrigerant supplied to the cooling portion 30 during operation of the compressor 12 has been detected is included. In this case, as in the case of control in the other example of the first embodiment, described with reference to FIG. 9, it is possible to prevent overheating of the EV device 31 and, as a result, poor operation of the EV device 31, so it is possible to allow the electric vehicle to travel at a certain distance and to stop safely.

Note that in the above embodiments, the cooling system 1 that cools an electrical device mounted on the vehicle by taking the EV device 31 as an example is described. The electrical device is not limited to the illustrated electrical devices, such as the inverter and the motor generator. The electrical device may be any electrical device as long as it generates heat when it is operated. In the case where there are a plurality of electrical devices to be cooled, the plurality of electrical devices desirably have a common cooling target temperature range. The cooling target temperature range is an appropriate temperature range as a temperature environment in which the electrical devices are operated.

Furthermore, the heat generating source cooled by the cooling system 1 according to the embodiments of the invention is not limited to, the electrical device mounted on the vehicle; instead, it may be any device that generates heat or may be a heat generating portion of any device.

The embodiments of the invention are described above; however, the configurations of the embodiments may be combined where appropriate. In addition, the embodiments described above should be regarded as only illustrative in every respect and not restrictive. The scope of the invention is indicated not by the above description but by the appended claims, and is intended to include all modifications within the meaning and scope equivalent to the scope of the appended claims.

The cooling system according to the aspects of the invention may be particularly advantageously applied to cooling of an electrical device, such as a motor generator and an inverter, using a vapor compression refrigeration cycle for cooling a cabin, in a vehicle, such as an electric vehicle, equipped with the electrical device.

The invention claimed is:

1. A control device for a cooling system that cools a heat generating source, the cooling system including: a compressor that circulates refrigerant; a heat exchanger that exchanges heat between the refrigerant and outside air; a cooling portion that uses the refrigerant to cool the heat generating source; a first line through which the refrigerant, which has been discharged from the compressor, flows to the cooling portion; a second line through which the refrigerant circulates between the heat exchanger and the cooling portion; and a selector valve that switches between fluid communication of the first line and fluid communication of the second line, the control device comprising:

a detecting unit configured to detect an abnormality of the compressor; and a switching unit configured to switch the selector valve to interrupt the fluid communication of the first line and to allow the fluid communication of the second line when the abnormality has been detected by the detecting unit.

2. A control device for a cooling system that cools a heat generating source, the cooling system including: a compressor that circulates refrigerant; a heat exchanger that exchanges heat between the refrigerant and outside air; a cooling portion that uses the refrigerant to cool the heat generating source; a first line through which the refrigerant, which has been discharged from the compressor, flows to the cooling portion; a second line through which the refrigerant circulates between the heat exchanger and the cooling portion; and a selector valve that switches between fluid communication of the first line and fluid communication of the second line, the control device comprising:

a detecting unit configured to detect an abnormality of a flow rate of the refrigerant supplied to the cooling portion during operation of the compressor; and a switching unit configured to switch the selector valve to interrupt the fluid communication of the first line and to allow the fluid communication of the second line when the abnormality has been detected by the detecting unit.

3. The control device according to claim 1, wherein the heat generating source is mounted on a vehicle, the control device further comprising:

a restricting unit configured to restrict a travelling state of the vehicle when the abnormality has been detected by the detecting unit.

4. The control device according to claim 3, wherein the heat generating source is an electrical device mounted on the vehicle, and the restricting unit restricts the travelling state of the vehicle by restricting an amount of heat generated by the electrical device so that a temperature of the electrical device is lower than a reference temperature.

5. The control device according to claim 1, further comprising: a cooling performance increasing unit configured to increase cooling performance of the cooling system for cooling the heat generating source when the abnormality has been detected by the detecting unit.

6. The control device according to claim 5, wherein the cooling performance increasing unit improves the cooling performance of the cooling system for cooling the heat generating source by increasing an amount of heat exchanged between the refrigerant and the outside air in the heat exchanger.

7. The control device according to claim 1, further comprising: a notification unit configured to provide notification of the abnormality when the abnormality has been detected by the detecting unit.

8. A control method for a cooling system that cools a heat generating source, the cooling system including: a compressor that circulates refrigerant; a heat exchanger that exchanges heat between the refrigerant and outside air; a cooling portion that uses the refrigerant to cool the heat generating source; a first line through which the refrigerant, which has been discharged from the compressor, flows to the cooling portion; a second line through which the refrigerant circulates between the heat exchanger and the cooling portion; and a selector valve that switches between fluid communication of the first line and fluid communication of the second line, the control method comprising:
    determining whether there is an abnormality in the compressor; and
    switching the selector valve to interrupt the fluid communication of the first line and to allow the fluid communication of the second line when it is determined that there is the abnormality.

9. A control method for a cooling system that cools a heat generating source, the cooling system including: a compressor that circulates refrigerant; a heat exchanger that exchanges heat between the refrigerant and outside air; a cooling portion that uses the refrigerant to cool the heat generating source; a first line through which the refrigerant, which has been discharged from the compressor, flows to the cooling portion; a second line through which the refrigerant circulates between the heat exchanger and the cooling portion; and a selector valve that switches between fluid communication of the first line and fluid communication of the second line, the control method comprising:
    determining whether there is an abnormality in a flow rate of the refrigerant supplied to the cooling portion during operation of the compressor; and
    switching the selector valve to interrupt the fluid communication of the first line and to allow the fluid communication of the second line when it is determined that there is the abnormality.

10. The control method according to claim 8, wherein the heat generating source is mounted on a vehicle, the control method further comprising:
restricting a travelling state of the vehicle when it is determined that there is the abnormality.

11. The control method according to claim 10, wherein the heat generating source is an electrical device mounted on the vehicle, and the travelling state of the vehicle is restricted by restricting an amount of heat generated by the electrical device so that a temperature of the electrical device is lower than a reference temperature.

12. The control method according to claim 8, further comprising:
    increasing cooling performance of the cooling system for cooling the heat generating source when it is determined that there is the abnormality.

13. The control method according to claim 12, wherein the cooling performance of the cooling system for cooling the heat generating source is improved by increasing an amount of heat exchanged between the refrigerant and the outside air in the heat exchanger.

14. The control method according to claim 8, further comprising:
    providing notification of the abnormality when it is determined that there is the abnormality.

* * * * *